US012567214B2

(12) United States Patent
Engel et al.

(10) Patent No.: US 12,567,214 B2
(45) Date of Patent: Mar. 3, 2026

(54) CONTROL STRUCTURES FOR PROCEDURAL GUIDANCE SYSTEMS

(71) Applicant: LabLightAR Inc., Seattle, WA (US)

(72) Inventors: Stacia R. Engel, Woodbridge, CA (US); William Peria, Shoreline, WA (US); Roger Brent, Seattle, WA (US)

(73) Assignee: LabLightAR, Inc., Seattle, WA (US)

( * ) Notice: Subject to any disclaimer, the term of this patent is extended or adjusted under 35 U.S.C. 154(b) by 91 days.

(21) Appl. No.: 18/140,927

(22) Filed: Apr. 28, 2023

(65) Prior Publication Data

US 2023/0377283 A1      Nov. 23, 2023

Related U.S. Application Data

(60) Provisional application No. 63/336,518, filed on Apr. 29, 2022.

(51) Int. Cl.
| | |
|---|---|
| *G06T 19/00* | (2011.01) |
| *G02B 27/01* | (2006.01) |
| *G06F 3/01* | (2006.01) |
| *G06F 16/36* | (2019.01) |
| *G06V 20/20* | (2022.01) |

(52) U.S. Cl.
CPC .......... *G06T 19/006* (2013.01); *G02B 27/017* (2013.01); *G06F 3/011* (2013.01); *G06F 16/36* (2019.01); *G06V 20/20* (2022.01)

(58) Field of Classification Search
None
See application file for complete search history.

(56) References Cited

U.S. PATENT DOCUMENTS

| | | | |
|---|---|---|---|
| 10,467,534 B1 | 11/2019 | Brent et al. | |
| 10,706,626 B1 | 7/2020 | Brent et al. | |
| 10,963,750 B2 | 3/2021 | Brent et al. | |
| 2007/0005592 A1* | 1/2007 | Kender ................. | G06F 40/169 |
| 2013/0296720 A1* | 11/2013 | McKinley ............ | A61B 5/0205 705/2 |
| 2014/0176603 A1* | 6/2014 | Kumar .................... | G06F 3/011 345/633 |
| 2014/0195518 A1* | 7/2014 | Kelsey ................. | G06F 16/367 707/722 |
| 2019/0318065 A1 | 10/2019 | Brent et al. | |
| 2019/0333095 A1* | 10/2019 | Passantino ......... | G06Q 30/0276 |
| 2020/0142388 A1* | 5/2020 | Maggiore ............. | H04W 4/022 |
| 2020/0250956 A1* | 8/2020 | Hayes .................... | G16H 40/20 |
| 2021/0093876 A1* | 4/2021 | Montague .............. | G16H 80/00 |

(Continued)

OTHER PUBLICATIONS

Koidan, New Datasets for 3D Object Recognition, Nov. 19, 2018, Neurohive, 12 pages. <URL: https://medium.com/neurohive-computer-vision/new-datasets-for-3d-object-recognition-30039fa34116>.

(Continued)

*Primary Examiner* — Jwalant Amin
(74) *Attorney, Agent, or Firm* — Conley Rose, P.C.

(57) ABSTRACT

An augmented reality system includes a knowledge base and an ontology. The knowledgebase includes properties of objects, substances, and materials found in work environments, and the ontology includes settings for permitted entities, objects and materials, and properties and relations including dependency relationships among them, such that the ontology encodes procedures carried out in the work environment in a computable format.

20 Claims, 15 Drawing Sheets

(56) References Cited

U.S. PATENT DOCUMENTS

| | | | |
|---|---|---|---|
| 2021/0103586 A1* | 4/2021 | Quamar | ................. G06N 20/00 |
| 2021/0182627 A1 | 6/2021 | Brent et al. | |
| 2021/0273892 A1 | 9/2021 | Rakshit | |
| 2021/0406625 A1 | 12/2021 | Brent et al. | |
| 2022/0102013 A1* | 3/2022 | Mitsumori | ............. G16H 70/20 |

OTHER PUBLICATIONS

Xiang et al., ObjectNet3D: A Large Scale Database for 3D Object Recognition, Stanford University, 2016, 16 pages. <URL: https://cvgl.stanford.edu/papers/xiang_eccv16.pdf>.

International Patent Application No. PCT/US2023/020502, International Search Report and Written Opinion mailed Aug. 24, 2023, 9 pages.

Kamran Munir et al., 'The use of ontologies for effective knowledge modelling and information retrieval', Applied Computing and Informatics, vol. 14, Issue 2, pp. 116-126, Jul. 2018 [retrieved on Aug. 6, 2023]. Retrieved from: URL: https://doi.org/10.1016/j.aci.2017.07.003 pp. 116-124.

* cited by examiner

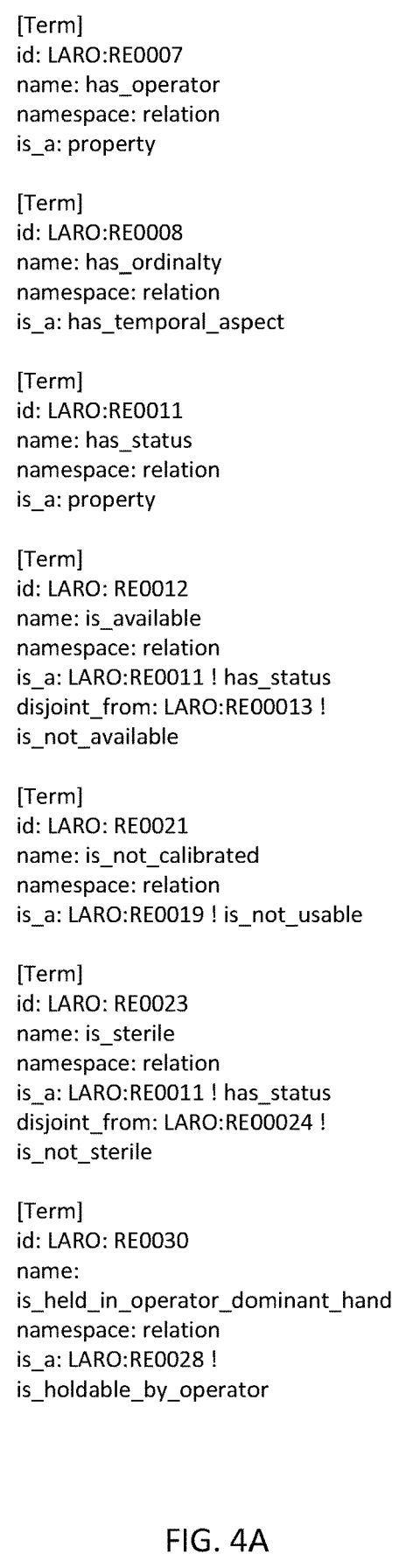

[Term]
id: LARO:RE0007
name: has_operator
namespace: relation
is_a: property

[Term]
id: LARO:RE0008
name: has_ordinalty
namespace: relation
is_a: has_temporal_aspect

[Term]
id: LARO:RE0011
name: has_status
namespace: relation
is_a: property

[Term]
id: LARO: RE0012
name: is_available
namespace: relation
is_a: LARO:RE0011 ! has_status
disjoint_from: LARO:RE00013 !
is_not_available

[Term]
id: LARO: RE0021
name: is_not_calibrated
namespace: relation
is_a: LARO:RE0019 ! is_not_usable

[Term]
id: LARO: RE0023
name: is_sterile
namespace: relation
is_a: LARO:RE0011 ! has_status
disjoint_from: LARO:RE00024 !
is_not_sterile

[Term]
id: LARO: RE0030
name:
is_held_in_operator_dominant_hand
namespace: relation
is_a: LARO:RE0028 !
is_holdable_by_operator

FIG. 4A

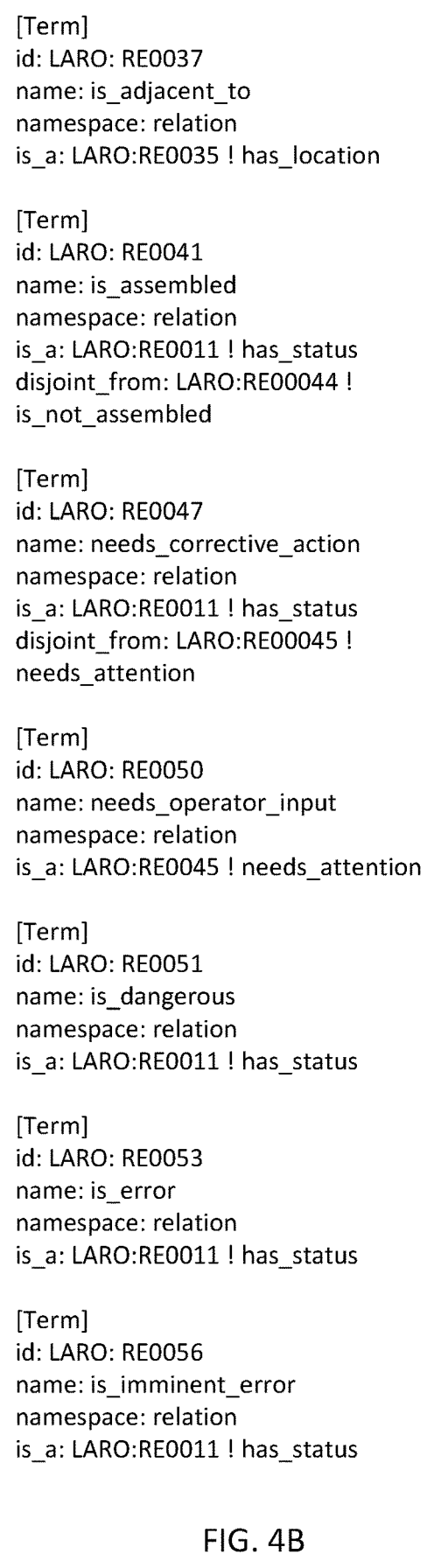

[Term]
id: LARO: RE0037
name: is_adjacent_to
namespace: relation
is_a: LARO:RE0035 ! has_location

[Term]
id: LARO: RE0041
name: is_assembled
namespace: relation
is_a: LARO:RE0011 ! has_status
disjoint_from: LARO:RE00044 !
is_not_assembled

[Term]
id: LARO: RE0047
name: needs_corrective_action
namespace: relation
is_a: LARO:RE0011 ! has_status
disjoint_from: LARO:RE00045 !
needs_attention

[Term]
id: LARO: RE0050
name: needs_operator_input
namespace: relation
is_a: LARO:RE0045 ! needs_attention

[Term]
id: LARO: RE0051
name: is_dangerous
namespace: relation
is_a: LARO:RE0011 ! has_status

[Term]
id: LARO: RE0053
name: is_error
namespace: relation
is_a: LARO:RE0011 ! has_status

[Term]
id: LARO: RE0056
name: is_imminent_error
namespace: relation
is_a: LARO:RE0011 ! has_status

FIG. 4B

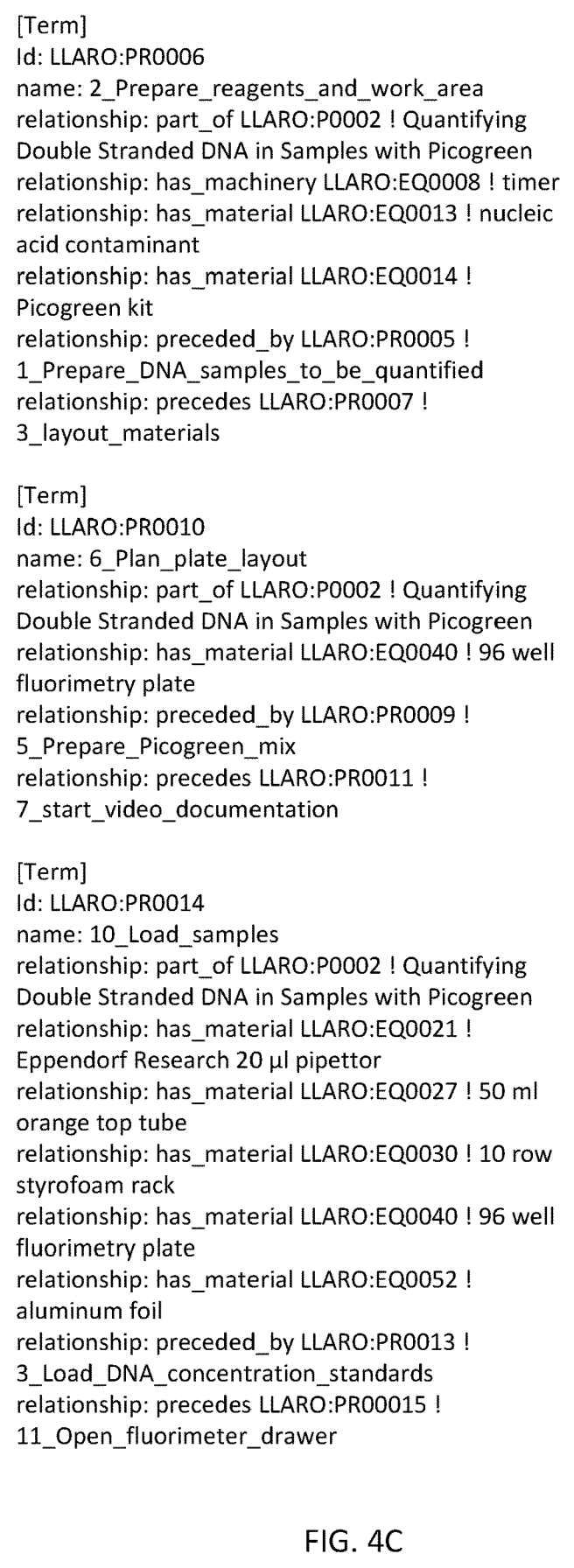

[Term]
Id: LLARO:PR0006
name: 2_Prepare_reagents_and_work_area
relationship: part_of LLARO:P0002 ! Quantifying
Double Stranded DNA in Samples with Picogreen
relationship: has_machinery LLARO:EQ0008 ! timer
relationship: has_material LLARO:EQ0013 ! nucleic
acid contaminant
relationship: has_material LLARO:EQ0014 !
Picogreen kit
relationship: preceded_by LLARO:PR0005 !
1_Prepare_DNA_samples_to_be_quantified
relationship: precedes LLARO:PR0007 !
3_layout_materials

[Term]
Id: LLARO:PR0010
name: 6_Plan_plate_layout
relationship: part_of LLARO:P0002 ! Quantifying
Double Stranded DNA in Samples with Picogreen
relationship: has_material LLARO:EQ0040 ! 96 well
fluorimetry plate
relationship: preceded_by LLARO:PR0009 !
5_Prepare_Picogreen_mix
relationship: precedes LLARO:PR0011 !
7_start_video_documentation

[Term]
Id: LLARO:PR0014
name: 10_Load_samples
relationship: part_of LLARO:P0002 ! Quantifying
Double Stranded DNA in Samples with Picogreen
relationship: has_material LLARO:EQ0021 !
Eppendorf Research 20 µl pipettor
relationship: has_material LLARO:EQ0027 ! 50 ml
orange top tube
relationship: has_material LLARO:EQ0030 ! 10 row
styrofoam rack
relationship: has_material LLARO:EQ0040 ! 96 well
fluorimetry plate
relationship: has_material LLARO:EQ0052 !
aluminum foil
relationship: preceded_by LLARO:PR0013 !
3_Load_DNA_concentration_standards
relationship: precedes LLARO:PR00015 !
11_Open_fluorimeter_drawer

FIG. 4C

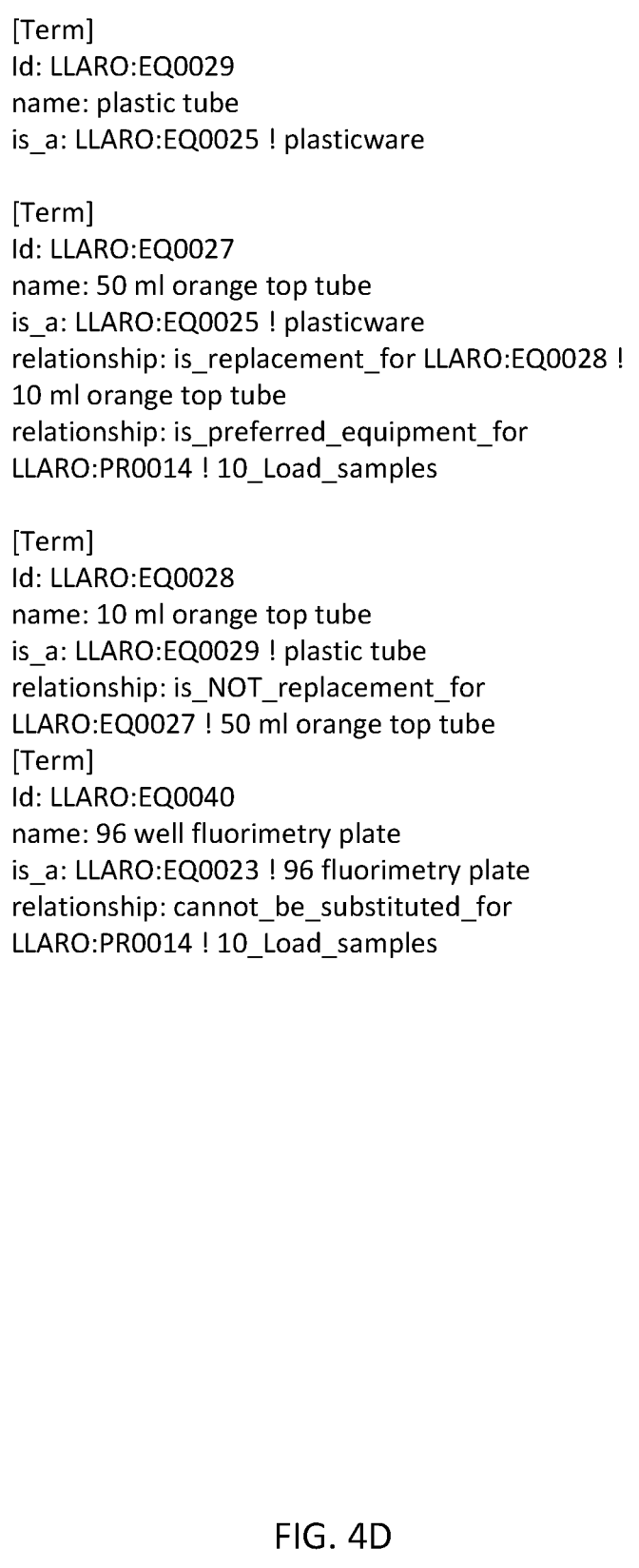

[Term]
Id: LLARO:EQ0029
name: plastic tube
is_a: LLARO:EQ0025 ! plasticware

[Term]
Id: LLARO:EQ0027
name: 50 ml orange top tube
is_a: LLARO:EQ0025 ! plasticware
relationship: is_replacement_for LLARO:EQ0028 !
10 ml orange top tube
relationship: is_preferred_equipment_for
LLARO:PR0014 ! 10_Load_samples

[Term]
Id: LLARO:EQ0028
name: 10 ml orange top tube
is_a: LLARO:EQ0029 ! plastic tube
relationship: is_NOT_replacement_for
LLARO:EQ0027 ! 50 ml orange top tube
[Term]
Id: LLARO:EQ0040
name: 96 well fluorimetry plate
is_a: LLARO:EQ0023 ! 96 fluorimetry plate
relationship: cannot_be_substituted_for
LLARO:PR0014 ! 10_Load_samples

FIG. 4D

CONTROL STRUCTURES FOR PROCEDURAL GUIDANCE SYSTEMS

CROSS-REFERENCE TO RELATED PATENT APPLICATION

This application claims priority to U.S. Provisional Patent Application No. 63/336,518, filed on Apr. 29, 2022, entitled "Control Structures for Procedure Guidance Systems," which is hereby incorporated by reference in its entirety.

BACKGROUND

Objects commonly encountered in work and learning environments include, for example, tools, containers, materials, and instances of particular kinds of equipment defined by different makes, models, or SKU numbers from particular manufacturers. The specific objects are members of one or more object classes, for example, culture tubes, which are members of the class "tube" and also typically members of the class of "glassware" or "plasticware". Many objects may also be members of the larger class of objects commonly encountered in particular environments: for example, "objects found in labs" (as opposed for example to "objects found in vehicle maintenance facilities"). Specific objects differ in the object classes to which they belong.

Laboratories and other work or learning environments also typically contain substances (e.g., water) and materials (e.g., wire and Saran Wrap). The distinction between these terms can be blurry. For example, chemical compounds including water are often associated with Materials Safety Data Sheets (MSDSs). For that reason, herein the term materials refers to both substances (e.g., water, sodium chloride) and materials (e.g., insulated copper wire, Saran Wrap).

Some objects and materials may also be characterized by specific states or conditions. For example, water might be liquid or frozen, and an object, such as a specimen cabinet, might be locked.

U.S. Pat. Nos. 10,467,534, 10,706,626, and 10,963,750 describe, inter alia, the characterization of objects using aspects by which specific objects differ from one another. Together, the combination of dimensions, shapes, other distinguishable attributes (surface image features, radar cross-section, near-infrared albedo, etc., etc.) may be sufficient to allow explicit identification of different specific objects. Specific objects may be associated with information that might not be attained from direct observation: for example SKU numbers, published information about their use in particular procedures, chain of provenance or custody, their ratings in comparisons with other specific objects, expert knowledge of previous encounters with the same objects, and metrics of customer satisfaction.

There is a general need for procedural guidance systems such as those utilizing augmented reality (AR) for control structures characterizing specific objects and materials. Such structures may enable mechanisms to identify different objects and materials, and also may enable such systems and their human operators to manipulate such objects and materials.

Augmented reality refers to the superimposition, via the user's sensorium, of virtual entities made of information (i.e., made of bits) upon entities and environments in the physical world (i.e., those entities made of atoms). "Strong" Augmented Reality devices, including the Microsoft Hololens and Hololens 2, and the Magic Leap One, are exemplary systems that accomplish this superimposition upon the visual and audio sensorium of the user (herein called the 'operator'). Augmented reality may be particularly beneficial to types of work or teaching, including laboratory work, in which people must operate on physical objects to carry out some sort of process or procedure via adherence (which can be rigid or loose) to steps that comprise some sort of plan. Such work/teaching is referred to herein as 'procedural' in nature.

Strong AR devices enable presentation of content, including interactive procedural content or human-in-the-loop content that provides procedural guidance, guidance that may be of particular utility for operators whose work requires that they interact with objects in the physical world using their hands.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 4A-4D depict a logical control structure that may be formed from the knowledge base 302/ontology 304 duality and utilized by the procedural guidance logic 306 to generate procedural guidance via the augmented reality device 308.

DETAILED DESCRIPTION

Figure 1:
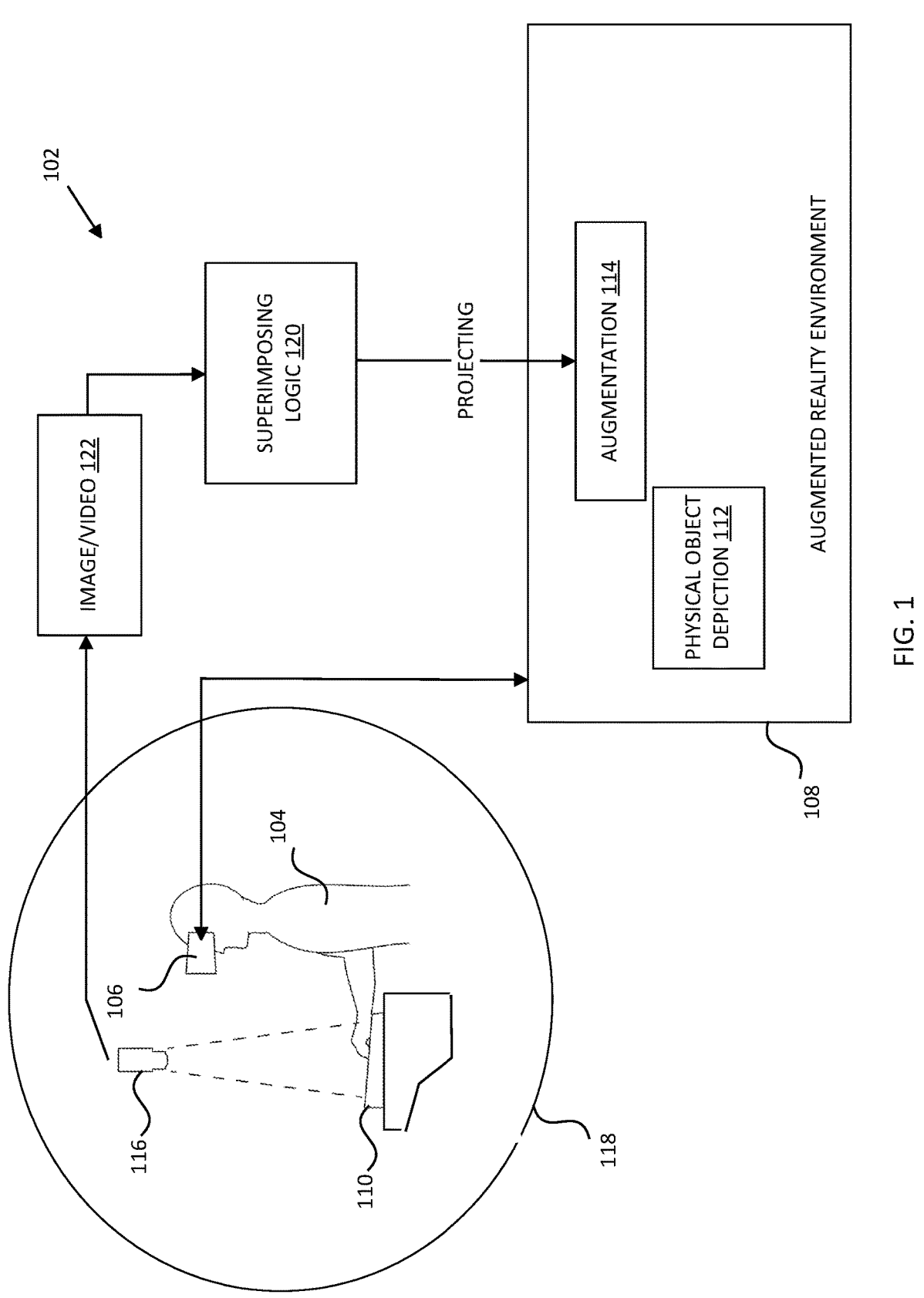
FIG. 1 depicts an embodiment of a work environment 102.

Control structures are disclosed to enable augmented reality systems to provide active positive procedural guidance, feedback, and other warnings to help avert operator errors. Such systems facilitate and democratize instruction by providing guidance for operators to carry out specialized tasks. The systems support continued operator training through failure analysis and troubleshooting, such as identifying conditions likely to fail or which are unsafe. The systems further support process optimization by providing guidance for alternate actions or items which may be necessary for protocol completion and working around constraints while still meeting process requirements and production guidelines.

Such systems increase the productivity of researchers, teachers, and other workers. Although embodiments are presented for AR systems, it should be understood that the disclosed solutions and technologies are applicable to virtual reality and mixed reality systems as well. "Virtual reality", or "VR", refers to the computer-generated simulation of a three-dimensional environment that can be interacted with in a seemingly real or physical way by a person using special electronic equipment, such as a headset with a display and gloves fitted with sensors. Virtual reality system which has visual or auditory elements which correspond to real-world objects are known as "mixed reality", or "MR". Collectively AR, VR, and MR are known as extended reality ("XR"). Unless otherwise indicated, the term "augmented reality" or "AR" herein should be understood to refer to any extended reality technology.

The disclosed control structures utilize hierarchical classification and cross-classification to improve the efficiency and safety of procedural guidance systems. In some instances, the control structures may be implemented by Directed Acyclic Graphs (DAGs). The control structures further encode relationships among objects, which may have settings including "permitted" and "forbidden". For example, a pipet tip might be forbidden to touch a benchtop, and the detection of such a relationship between pipet tip and benchtop in an encoded procedure, or in an actual procedure in process, may be recognized as an error. In another example, a heavy object that is unsecured more than a certain distance above a working area may be recognized as unsafe. A Bunsen burner may be recognized to be on fire and accepted as a permitted relationship, while a trash bag on fire would define an unsafe relationship.

Control structure settings may be applied manually, or derived from images or from video or depth camera information acquired for this purpose, or from other existing data (eg manufacturer's data sheets, MMDSs, CAD/CAM data descriptions of object shapes, images of objects), or from public sources such as ObjectNet3D (Xiang et al. 2016), MVTec ITODD and T-LESS (Neurohive, 2018), or identified by software agents such as spiders and crawlers.

In one implementation the repositories are structured in a flat file, or in a relational or other database via particular DAG ontologies, which may in some cases be generated by unsupervised methods such as clustering, or by hybrid approaches in which possible schemes of relatedness, some suggested by machine learning, are vetted and curated by humans. Some implementations may encode settings of the control structures as parameter weights in trained neural networks.

The systems also address shortcomings of conventional human-in-the-loop procedural guidance systems, by applying the control structures to generate machine-understanding of the procedural environment. This may enable functions that go beyond those enabled by current semantic segmentation computer vision approaches, such as recognizing correct operator completion of a step, providing the operator with action cues for the correct next steps, providing the operator with context-appropriate knowledge pertinent to objects, materials, and actions, identifying to the operator error conditions that might correspond to safety hazards, and warning the operator of imminent errors.

Herein the term "ontology" shall refer to a computable, controlled-vocabulary structure of settings comprising permitted entities (objects, materials, and certain immaterial entities) comprising permitted properties and relationships for the execution of chains of tasks. Objects and materials can be rigid, but also may be deformable (tubing), or even animate (e.g., mice). The resulting systems support the operation of interactive procedural guidance systems, robotic systems, and mixed human robotic systems.

The systems enable the accurate execution of tasks subject to different constraints, such as the absence or scarcity of desired materials and the occurrence of temporal disruptions. The systems thus address a growing need throughout industrial societies, which is for accurate well-performed and repeatable procedures from manufacturing to clinical diagnosis, in the face of disruptions in material supply chains and disruptions in the timing or ability to perform process steps due to power outages, pandemics, giant cyclonic storms, war, etc.

Identification of objects is supported by computational capabilities including computer vision systems that identify objects using aspects by which specific objects differ from one another: in their overall dimensions, in particular their three-dimensional shapes, and by other distinguishable characteristics such as surface color, albedo, and texture. These characteristics are not limited to those detectable by the visual light portion of the electromagnetic spectrum. Together, the combination of dimensions, shapes, other distinguishable attributes (surface image features, radar cross-section, near-infrared albedo, etc.) are sufficient to allow explicit identification of different specific objects.

The system ontology may encode permitted relationships among objects in the work environment, so that, using input from a computer vision component, the procedural guidance system may identify relationships among objects that corresponded to error conditions. Another type of relationship that may be encoded/detected is relationships among objects that indicated that a procedural step had been completed. In this second example, the human operator might not care about the relationships that determined that a step was complete, but simply that s/he was cleared to proceed to the next step.

Because the ontology is navigable by software entities, and, in different ways, by the human operators, it is referred to herein as being computable. Once established for a given knowledgebase, any such ontology comprises a significant addition to the knowledge in the repository of utility to the human operator and to other software entities that comprise the system.

The system ontology models protocols as pathways of related steps organized in temporal chains with established ordinality meant to accomplish predefined outcomes. The ontology models the necessary reagents and materials for the steps in the temporal chains as networks of required, preferred, replaceable, and irreplaceable objects. The system ontology provides guidance regarding strict or loose ordinality, allowable temporal overlap between steps or lack thereof, acceptable pause points and duration, and time-sensitive must-complete actions.

FIG. 1 depicts an embodiment of a work environment 102. An operator 104 (there may be more than one) wearing an augmented reality headset 106 interacts with physical objects and/or virtual objects in the augmented reality environment 108 according to a computer-aided procedure. In this example, the operator 104 interacts with a physical object 110 on a lab bench or other structure. The physical object 110 may be depicted in the augmented reality environment 108 (as physical object depiction 112) along with or replaced by an augmentation 114. The augmentation 114 may represent the entire physical object 110 and/or may depict augmenting information such as controls, settings, instructions, and so on for interacting with the physical object 110 (e.g., arrows, attention cues, look here cues, cues showing two or more objects are associated, cues warning of unsafe condition or imminent errors). The computer-aided procedure may provide open- or closed-loop operator guidance. Virtual objects and/or sounds may also be projected into the augmented reality environment 108.

An optional augmented camera 116 is directed to capture images or video of the physical workspace 118 of the work environment 102 from its visual field (field-of-view). The augmented camera 116 may be one or more fixed position cameras, or one or more moveable cameras, or a combination of fixed position cameras and moveable cameras. Superimposing logic 120 (which may be implemented in one or more of the augmented camera 116, augmented reality headset 106, or an auxiliary computing system) transforms the images or video 122 into a depiction in the augmented reality environment 108.

By way of example, the augmented reality environment 108 may depict the physical object 110 augmented with virtual content or may depict both the physical object 110 and the augmentation 114 as a combined virtualized depiction.

Figure 2:
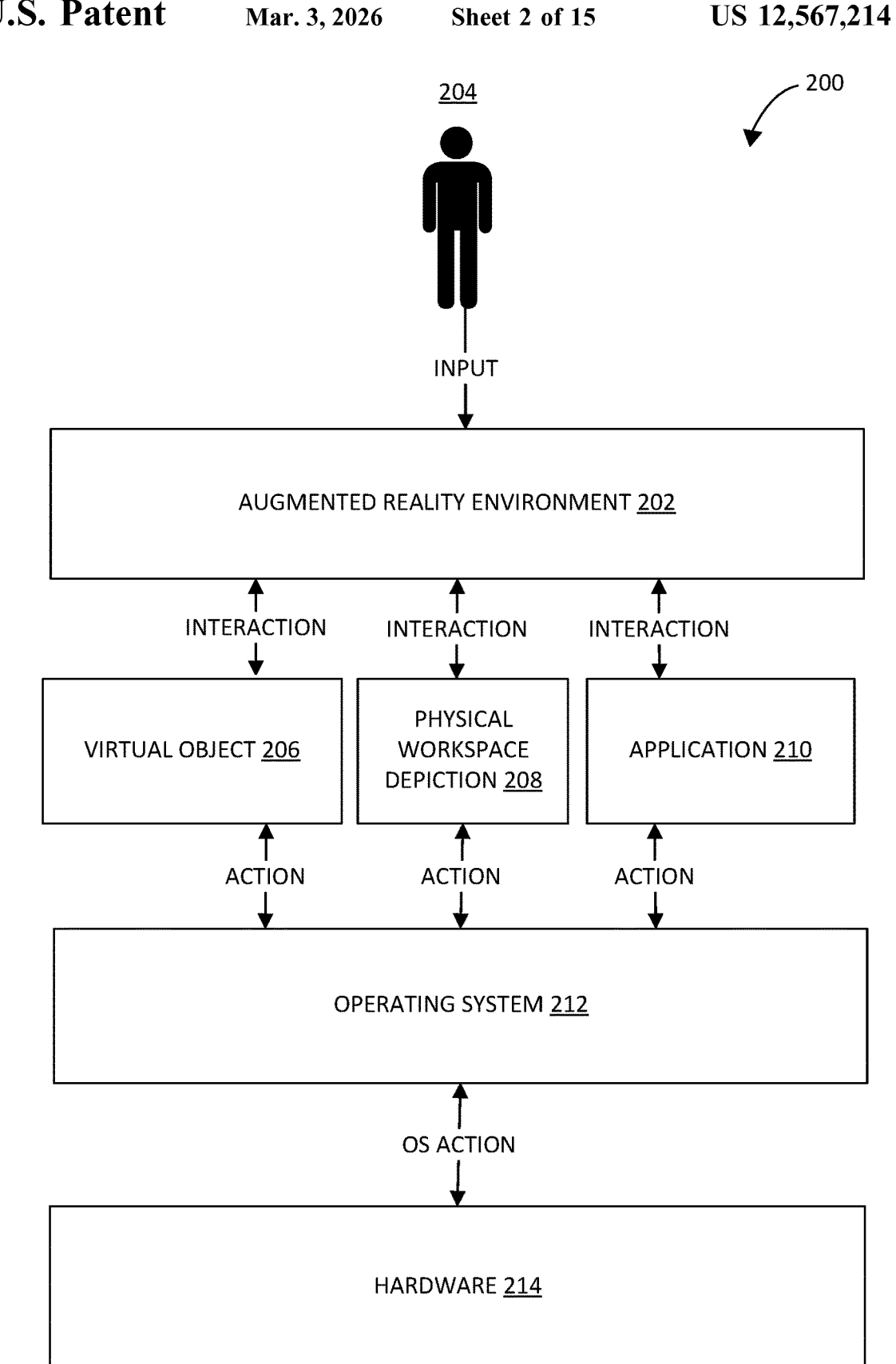
FIG. 2 depicts an augmented reality system 200 in accordance with one embodiment.

FIG. 2 depicts an augmented reality system 200 in accordance with one embodiment. The augmented reality environment 202 receives input from the operator 204 and in response sends an interaction signal to a virtual object 206 (which may be a composite of virtual information and the physical object depiction 112, a physical workspace depiction 208, or an application 210. The virtual object 206 or physical workspace depiction 208 or application 210 sends an action to an operating system 212 and in response, the operating system 212 operates the hardware 214 (e.g., an augmented reality headset) causing the software running on the headset to implement or direct the action in the augmented reality environment 202. As described, this action by the procedure or application that the software on the AR device is running can include actions that direct the operator to perform a task or induce the operator to take an action or to take particular actions based on feedback from the operator from the operator's input or actions ("closed-loop" control).

"Application" refers to any logic that is executed on a device above a level of the operating system. An application may typically be loaded by the operating system for execution and make function calls to the operating system for lower-level services. An application often has a user interface but this is not always the case. Therefore, the term 'application' includes background processes that execute at a higher level than the operating system. A particularly important kind of application that the device runs is those applications that are "protocols" or "procedures", or enable the device to "run" these. Protocols and procedures are applications providing procedural guidance, which can be open- or closed-loop, that guides the operator in the performance of particular tasks.

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

"Software" refers to logic implemented as instructions to a programmable device or component of a device (e.g., a programmable processor, controller). Software can be source code, object code, executable code, or machine language code, for example. Unless otherwise indicated by context, software shall be understood to mean the embodiment of said code in a machine memory or hardware component, including "firmware" and micro-code.

"Source code" refers to a high-level textual computer language that undergoes either interpretation or compilation in order to be executed by a device.

"Programmable device" refers to any logic (including hardware and software logic) whose operational behavior is configurable with instructions.

"Instructions" refers to symbols representing commands for execution by a device using a processor, microprocessor, controller, interpreter, or other programmable logic. Broadly, 'instructions' can mean source code, object code, and executable code. 'Instructions' herein is also meant to include commands embodied in programmable read-only memories (EPROM) or hardcoded into hardware (e.g., 'micro-code') and like implementations wherein the instructions are configured into a machine memory or other hardware component at manufacturing time of a device.

"Logic" refers to any set of one or more components configured to implement functionality in a machine. Logic includes machine memories configured with instructions that when executed by a machine processor cause the machine to carry out specified functionality; discrete or integrated circuits configured to carry out the specified functionality, and machine/device/computer storage media configured with instructions that when executed by a machine processor cause the machine to carry out specified functionality. Logic specifically excludes software per se, signal media, and transmission media.

Figure 3:
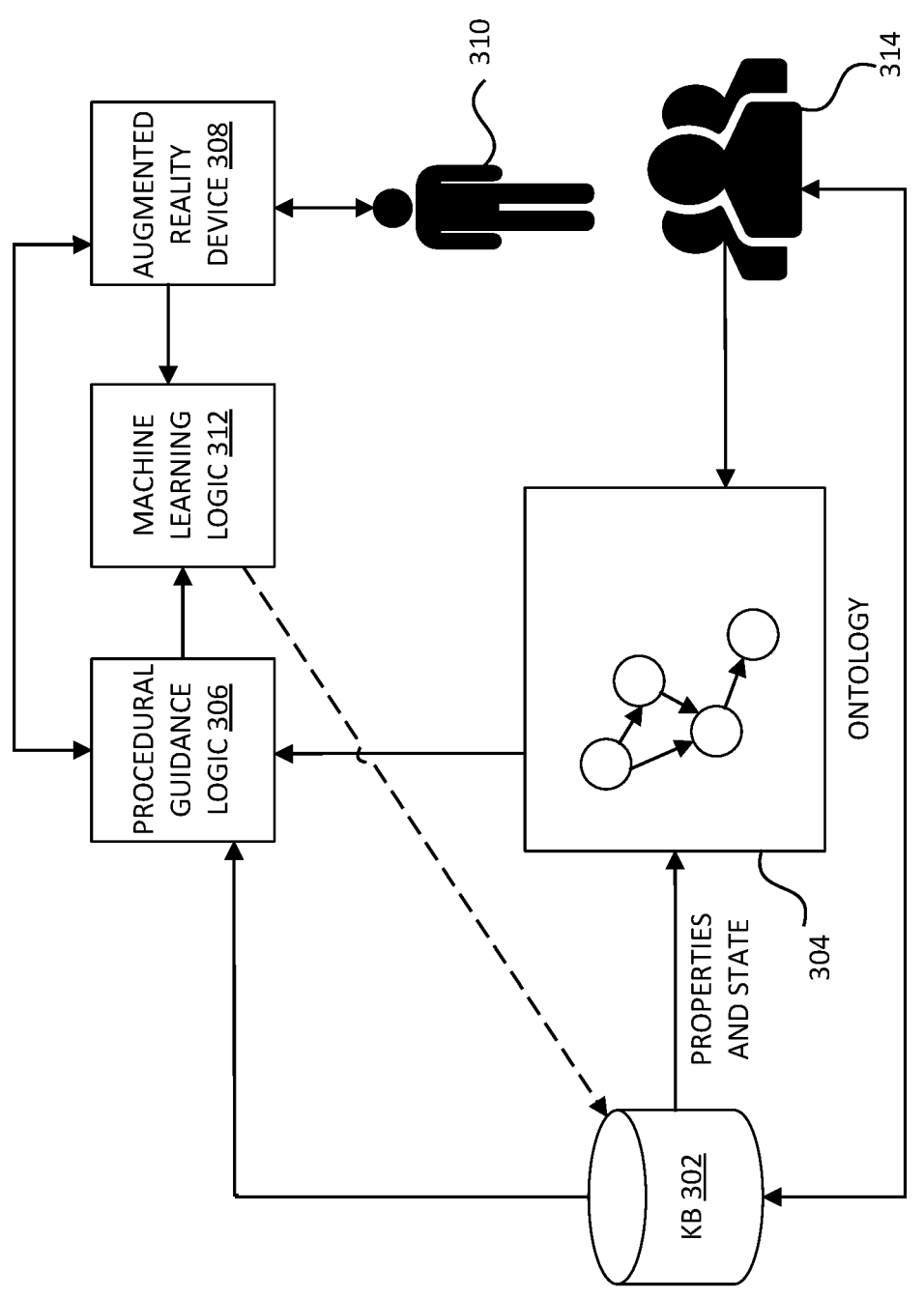
FIG. 3 depicts an augmented reality system in one embodiment.

FIG. 3 depicts an augmented reality system in one embodiment. The system comprises an operator 310 utilizing an augmented reality device 308 with sensory augmentations generated by procedural guidance logic 306. The procedural guidance logic 306 utilizes a knowledge base 302 and an ontology 304 to generate the augmentations. The knowledge base 302 comprises any of object, material, substance, procedure, environment, and equipment properties and characteristics (e.g., metadata tags such as SKUs, serial numbers, etc.), and their inter-relationships, to the ontology 304. Throughout, it should be understood that "properties" refers to one or both of properties and characteristics, unless indicated otherwise by context. The knowledge base 302 may be augmented/updated by machine learning logic 312, trainers 314, or both. The ontology 304 in this embodiment may be augmented by one or more human trainers 314.

The knowledge base 302 and the ontology 304 are complementary systems for organizing settings utilized by the procedural guidance logic 306 to control renderings by the augmented reality device 308. In the knowledge base 302, settings may be organized with table structure and 'references' (to other tables). In the ontology 304, settings may be organized by applying 'terms' and 'relations'. The ontology 304 may be part of a database, or may be accessed independently. The amount of overlap between the two information sub-systems is customizable based on how the overall augmented reality system is designed. At one extreme (no overlap between ontology 304 and knowledge base 302 (i.e., no knowledge base 302)), the system may function in autonomous mode, driven only from settings in the ontology 304. At the other extreme (complete overlap between ontology 304 and knowledge base 302 (i.e., ontology 304 stored completely in knowledge base 302)), the knowledge base 302 overall may comprise all settings and data points regarding protocol activity. This 'complete overlap' mode may be especially advantageous for downstream machine learning capabilities and applications. Considering these two extremes and the range of options between them, there is a subset of queries that may be carried out with access to the ontology 304 alone, without having to access a knowledge base 302. This 'lite package' or configuration operates with a 'genetic operator', with the headset in 'autonomous' mode, not connected to an active database but instead fully contained and mobile. The augmented reality device 308 operates in an autonomous mode providing instruction but does not collect data.

The knowledge base 302 comprises properties and characteristics about objects, materials, operations, etc. in the work environment that the computational moiety (procedural guidance logic 306) of the human-in-the-loop AR guidance system utilizes. The knowledge base 302 provides the procedural guidance logic 306 and the operator 310 structured settings from closed sources or local repositories.

In one embodiment the knowledge base 302 is implemented as a relational database structured as tables and data objects, with defined relations between them which enable identification and access to properties in relation to other properties. The properties in the knowledgebase may be organized around a 'protocol' as the main object type (a "protocol-centric relational database"). The knowledge base 302 is organized to enable successful completion of specific protocols, and thus may provision settings (the aforementioned properties) for protocols, their required materials, authorized operators, and so on. The knowledge base 302 may be queried using the programming language SQL (Structured Query Language) to access the property tables. In one embodiment the open-source PostgreSQL relational database management system (aka database engine) is utilized for creation, updating, and maintenance of the knowledge base 302.

The knowledge base 302 comprises distinct settings for various protocols and the steps therein, including context in which certain protocols are performed as well as their intended use, and required machinery, reagents, tools and supplies. This includes knowledge, for example, of servicing, storage requirements, and use-by dates about specific objects, such as items of equipment and materials.

For objects, the knowledge base 302 may comprise additional properties including but not limited to their overall dimensions, their particular three-dimensional shapes (including those defined by standard CAD/CAM datatypes), and other distinguishable optical characteristics such as surface color, albedo, and texture, which in turn can be used to define key points. Specific objects may be associated with masses and other properties which need not arise from direct observation, such as object classes, manufacturer, model numbers, SKU numbers, published information about their use in particular procedures, images and videos describing their operation, country of origin, transportation history/chain of possession/provenance, expert knowledge about the specific object or model, or class of object, ranking in comparisons with other specific objects, metrics of customer satisfaction, comments and annotations by expert users.

Object properties may further comprise object dimensions and features visible under different imaging modalities such as depth properties, hyperspectral visual properties, infrared properties, non-electromagnetic properties, and properties not accessible by direct observation.

For consumable reagents and supplies used in regulated processes, relevant properties may comprise the manufacturer, the vendor, the SKU/product number, the number of entities in the package (e.g., Pack of 10), the product's official name, sub-information typically appended to the official name, (e.g., "Solution in DMSO, 10×100 µL"), storage instructions (particularly including temperature range), expiration or use-by date, country of manufacture and other alphanumeric information on bar codes and QR codes.

Entities may be represented in the knowledge base 302 as members of one or more classes. Specific objects, substances, and materials differ in the object classes to which they belong. For example, culture tubes may be members of the class "tube" and also typically members of the class of "glassware" or "plasticware", and may be members of the larger class of "objects found in labs" (as opposed to vehicle maintenance facilities). This membership in multiple classes can be formally represented by Directed Acyclic Graphs (DAGs). The knowledge base 302 may additionally comprise learned knowledge such as collected information regarding protocol activity—which operators carried out what protocols at what point in time, protocol status (e.g., completed or paused or exited), protocol outcome, etc.

The knowledge base 302 enables the procedural guidance logic 306 of the human-in-the-loop AR procedural guidance system by codifying the necessary entity properties in computable form, thereby providing a fast, easy, and reliable method for supporting both structured queries to answer specific questions about objects, their relations to other objects, and related protocols. In addition to enabling the procedural guidance logic 306, the knowledge base 302 enables direct queries by the operator 310, for example by voice request after the word "provenance" or "customer reviews". Query-driven navigation of the knowledge base 302 is aided by specific terms in the associated ontology 304.

Although depicted and described herein as a system supporting operator 310 use of an augmented reality device 308 for procedural guidance, it may be readily apparent that the knowledge base 302 and ontology 304 may be utilized by automated or robotic systems, or mixed systems comprised of humans and robots. Learning accumulated in the knowledge base 302 by the machine learning logic 312 over the course of using the procedural guidance system (such as common points operators make errors), e.g., encoded in annotation tables, may be applied to improve the performance of the system on future protocols.

The system also utilizes the ontology 304 to enable operation of a human-in-the-loop AR interactive procedural guidance system. In one aspect, the ontology 304 enables operation of the procedural guidance logic 306 by providing a query-friendly structure for relevant knowledge including knowledge in the knowledge base 302. In another aspect, the ontology 304 may enable the operator 310 to apply queries to interact with the knowledge base 302 and the ontology 304. Queries may be structured by the operator in a way that reflects the logical organization of the ontology 304, or not (i.e., the ontology 304 may be navigated by search). As the ontology 304 grows, it embodies more and more knowledge that scholars and workers may utilize to their benefit.

As the system provides procedural guidance and the operator 310 and the system transition from step to step, the procedural guidance logic 306 may draw settings and properties from the ontology 304 and the knowledge base 302. The ontology 304 in conjunction with properties obtained from the knowledge base 302 enable the procedural guidance system to 'understand' what it is seeing via its sensors and to guide the operator 310 on what to do next, or to detect when the operator 310 is about to make an error. To aid in understanding, queries from the procedural guidance logic 306 are structured by the ontology 304. These queries are typically a consequence of the system running interactive procedural content, and frequently draw on knowledge in the knowledge base 302 (for example, associated information about a given material might indicate that it is explosive).

The ontology 304 encodes concepts (immaterial entities), terms (material entities), and relationships (relations) useful for the description of protocols and processes and guidance for their execution. In biotechnology and biopharma, processes can include lab bench protocols and also procedures requiring operation and maintenance of particular items of equipment such as cell sorting instruments, fermentors, isolation chambers, and filtration devices. The ontology 304 enables the description the procedures and processes as pathways, or 'activity models', comprising a collection of connected, complex statements in a structured, scalable, computable manner.

The ontology 304 encodes concepts (immaterial entities), terms (material entities), and relationships (relations) for the description of protocols, procedures, and/or processes and guidance for their execution. The ontology 304 enables the description of each of these as pathways, or 'activity models', comprising a collection of connected, complex statements in a structured, scalable, computable manner. Herein, it should be understood that a reference to any of protocols, procedures, or processes refers to some or all of these, unless otherwise indicated by context.

The ontology 304 comprises a computational structure for entities relevant to sets of protocols. These entities include both material and immaterial objects. Material entities include required machinery, reagents and other materials, as well as authorized human operators. Immaterial objects include the protocols themselves, the steps therein, specific operations, their ordinality, contexts in which specific protocols are performed, timing of events, corrective actions for errors, and necessary relations used for describing how these material and immaterial entities interact with or relate to one another. The ontology 304 encodes in a structured and computable manner the different protocols, materials, and actions ('codified' or 'known' settings), and supports the performance of protocols by facilitating the recording (in the knowledge base 302) of data points regarding execution and outcome of protocols (state information and 'collected' or 'learned' settings). Execution and outcome results may in one embodiment be encoded using annotation tables to support the use of machine learning logic 312 in the system.

In one embodiment the ontology 304 is implemented as structured settings representing material entities (embodied in the set of object terms), immaterial entities (concepts), and the relationships (relations) between them, with the potential to enumerate the universe of possible actions performed in protocols. A formalism of the temporal modeling enabled by the ontology 304 represents protocols as structured, computable combinations of steps, materials, timing, and relations. The ontology 304 encodes protocol settings for specific work environments for the performance of protocols, procedures, tasks, and projects.

Procedures encoded in the ontology 304 each include one or more tasks/steps, and these tasks/steps may be associated with certain dimensions and properties. Some of these dimensions and properties are enumerated as follows.

Revocability. If an action of a step is misapplied, can it be repeated, or does this deviation destroy or degrade the process such that a restart is required? Properties to characterize this dimension of a procedural step may include revocable, irrevocable, can_repeat_step, must_start_from_beginning. The meaning of these properties is evident from the naming.

Self-contained-ness. May a step, for example, a repair_step, be carried out with resources (people and materials) inside a facility, or need it rely on outside inputs (e.g., scheduled visit of repair people)? Properties to characterize this dimension of a procedural step may include fixable_in_house or needs_outside_talent. In a relational DAG encoding, fixable_in_house may be related to what's_wrong, and what's_wrong may have relations including how_does_it_usually_fail? and how_do_we_fix_it?

Other important dimensions for protocols, procedures, processes, and even projects include those along a temporal and/or causal axis. This includes ordinality, temporality, cause and effect, and dependency.

Ordinality. What is the order of this step? What comes before it, what after it? Examples include precedes_step.

Temporality. When does a particular step occur or need to occur in clock time? How long is it likely to be before the protocol or process can be completed? Examples include elapsed_time and time_to_finish.

Cause and effect. This dimension may be useful for troubleshooting and analysis of failures. One property characterizing this dimension is frequent suspect.

An object may fail (break), a process_step may fail (not yield starting material or state for the next configured step), and an operation may fail (to be performed properly). A reagent or kit may fail (for reasons described by terms such as become_contaminated or expire). These entities may be configured with a property such as failure_prone, delicate or fragile, robust, or foolproof. Objects may be characterized by quantitative values including mean_time_to_failure and in some cases use_by_date or service_by_date.

There are also general ways an operator can fail (typically, by dropping, breaking, or contaminating). An operator may be characterized by a property such as a klutz or have_golden_hands.

The entire protocol or process may fail because of failures in objects, process_steps, or operations, and also because process steps and operations were performed out of sequence or without satisfying necessary dependency relationships. A process_step may be nominal, suboptimal, and in some embodiments, superoptimal, and the outcome of a process may be nominal, suboptimal, or failed. An entire protocol or process may fail, defined as failure to generate results or products that satisfy acceptance criteria. When that happens the ontology 304 may enable interrogation of the temporal model to identify suspected points of failure and reference to a recording of the performed process to identify certain kinds of failures such as out_of sequence operations.

Dependency. Is a designated step (e.g., a protocol step) dependent on one or more previous steps, and if so, how? Examples include:

finish_to_start. (step B can't start until previous step A has finished).

finish_to_finish (step B can't finish before previous step A finishes)

start_to_start (step B can't start until previous step A starts)

start_to_finish (step B can't finish until step A starts)

As noted previously, the ontology 304 supports the computational moiety (procedural guidance logic 306) of the human-in-the-loop AR procedural guidance system by codifying the necessary knowledge (about procedure, materials, and workplace) in computable form, thereby providing a fast, easy, and reliable method for supporting both structured and spontaneous queries to answer specific questions about objects, their relations to other objects, related protocols, and their execution.

This computability supports novel and particularly useful functions. These include but are not limited to recognizing whether of whether conditions (materials and objects and relations) to carry out a particular procedure exist, recognition of correct operator 310 completion of a step, provision of the operator 310 with action cues for next actions, communication to the operator 310 of error conditions that might correspond to safety hazards or allow the operator to avert imminent errors, provision of the operator 310 with additional context-appropriate knowledge pertinent to objects, materials, and actions, and warning the operator 310 of imminent errors.

For example, for protocols requiring cleanliness or sterility, pipet_tip_point on lab_bench is an error condition. Another example is recognizing that a 50 mL_tube is_moved_to a 50 mL_tube rack might mark the completion of a step. This recognition might cause the procedural guidance system to offer up the next action cue. Another example involves a protocol in which having pipet_tip_point in well_A3 of a 96_well_plate might marks successful step completion, while placing the pipet_tip_point into well_A4 might be an error condition. Recognition that the pipet_tip_point was over the wrong well would allow the system to warn the operator and allow the operator to avert the imminent error.

Another dimension of procedures encoded in the ontology 304 is resilience, the capability to work the procedure around absences, differences, or shortages of materials and objects and being able to execute the process successfully within constraints (for example, time, quality or regulatory constraints).

Resilience also characterizes the capability to work around temporal disruptions (e.g., due to power outages or late arrival of materials), including disruptions that affect the time needed to complete a step, or to successfully execute a process or task. To represent resilience to such disruptions, the ontology 304 may utilize expiration dates and relationships pertinent to temporality and/or causality that are encoded for objects/materials in the knowledge base 302, including revocable/irreversible, ordinality, and dependency relationships. For example, a key material needed for production step two of a procedure may expire in two weeks. However step two may be initiated at a time/date such that in twelve days from its initiation it may be completed, the procedure paused, and step three then initiated on schedule.

The knowledge base 302/ontology 304 duality may also be utilized to directly aid the operator 310 carry out process steps. For example, the operator 310 may voice hands-free commands for help/instruction or to navigate the knowledge base 302 or ontology 304 ("tell_me_more", "down", "up", and "drill"). The knowledge base 302/ontology 304 may enable the query of sequences of presentations authored by others (e.g., "tour", which tells the operator the next important thing some author thought the operator should know). A map may be displayed by the augmented reality device 308 depicting where the operator 310 is in the knowledge base 302/ontology 304. Voice commands may also activate hypertext links ("jump") and search functions.

FIGS. 4A-4D depict a logical control structure that may be formed from the knowledge base 302/ontology 304 duality and utilized by the procedural guidance logic 306 to generate procedural guidance via the augmented reality device 308. The columns in FIGS. 4A and 4B depict a partial list of permitted relationships including many specific to procedural guidance. The columns in FIGS. 4C and 4D depict specific steps in a protocol, depicting the specific steps, entities, and relationships pertinent to each step.

Figure 5:
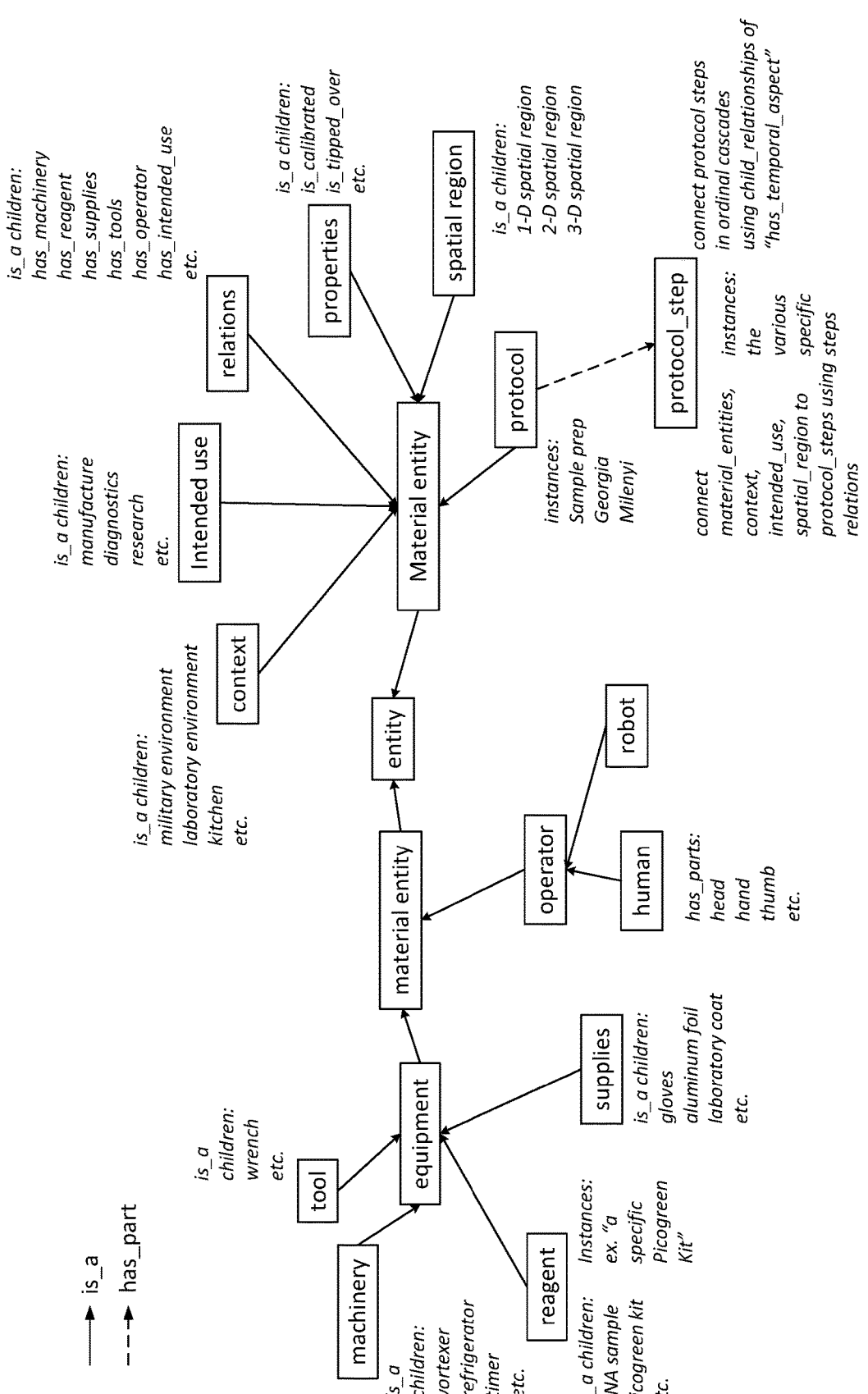
FIG. 5 depicts an example of a control structure of the ontology 304.

FIG. 5 depicts an example of a control structure of the ontology 304. Boxes show classes of terms, lists beside show specific examples of each term, and arrows depict two particular types of relationship/properties, is_a and has_part.

Figure 6:
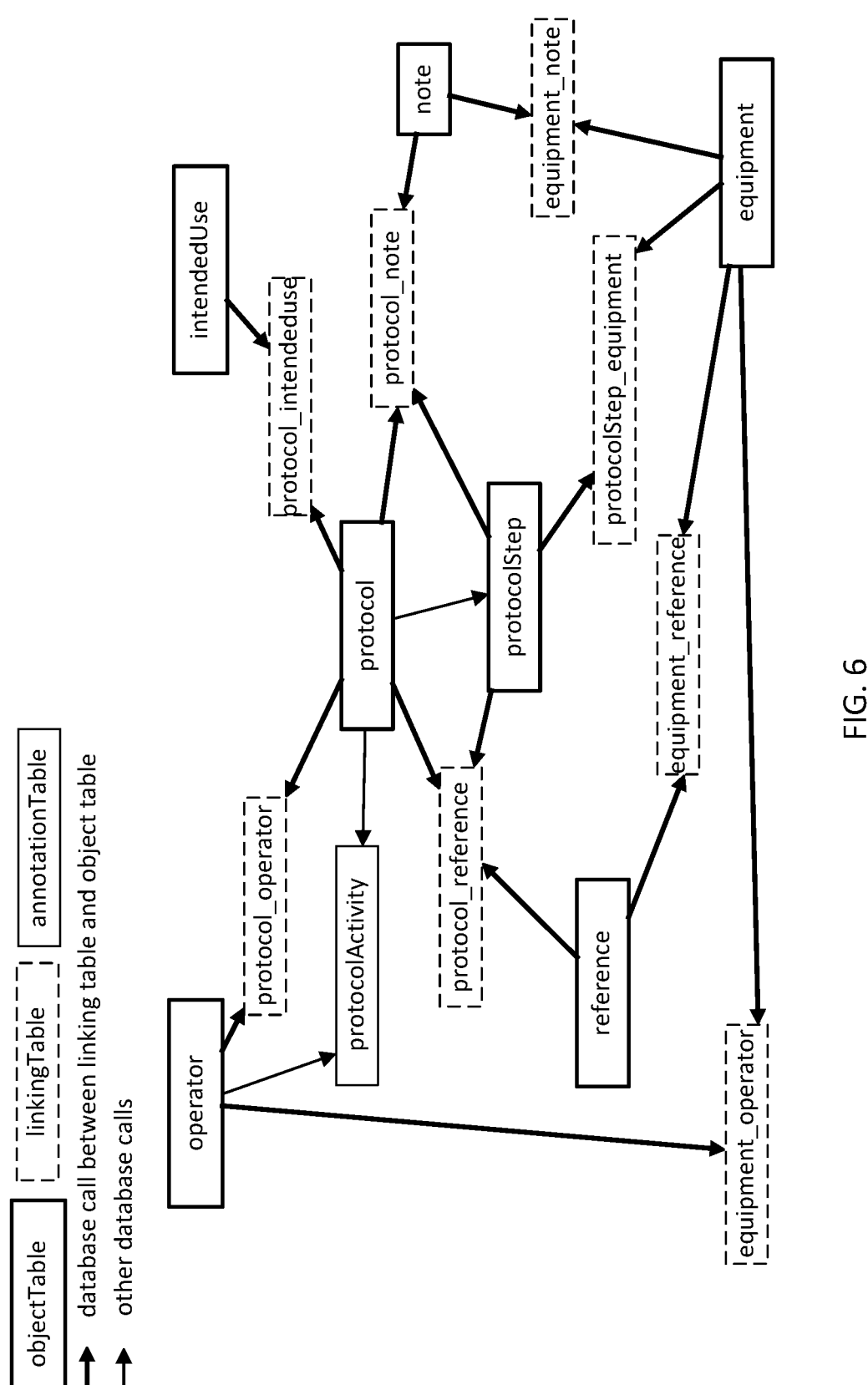
FIG. 6 depicts an example of a control structure of the knowledge base 302.

FIG. 6 depicts an example of a control structure of the knowledge base 302. The control structure comprises tables and linking tables. Arrows depict database calls. The term "annotation table" describes tables comprising settings/data points collected during operation of the procedural guidance system.

Figure 7:
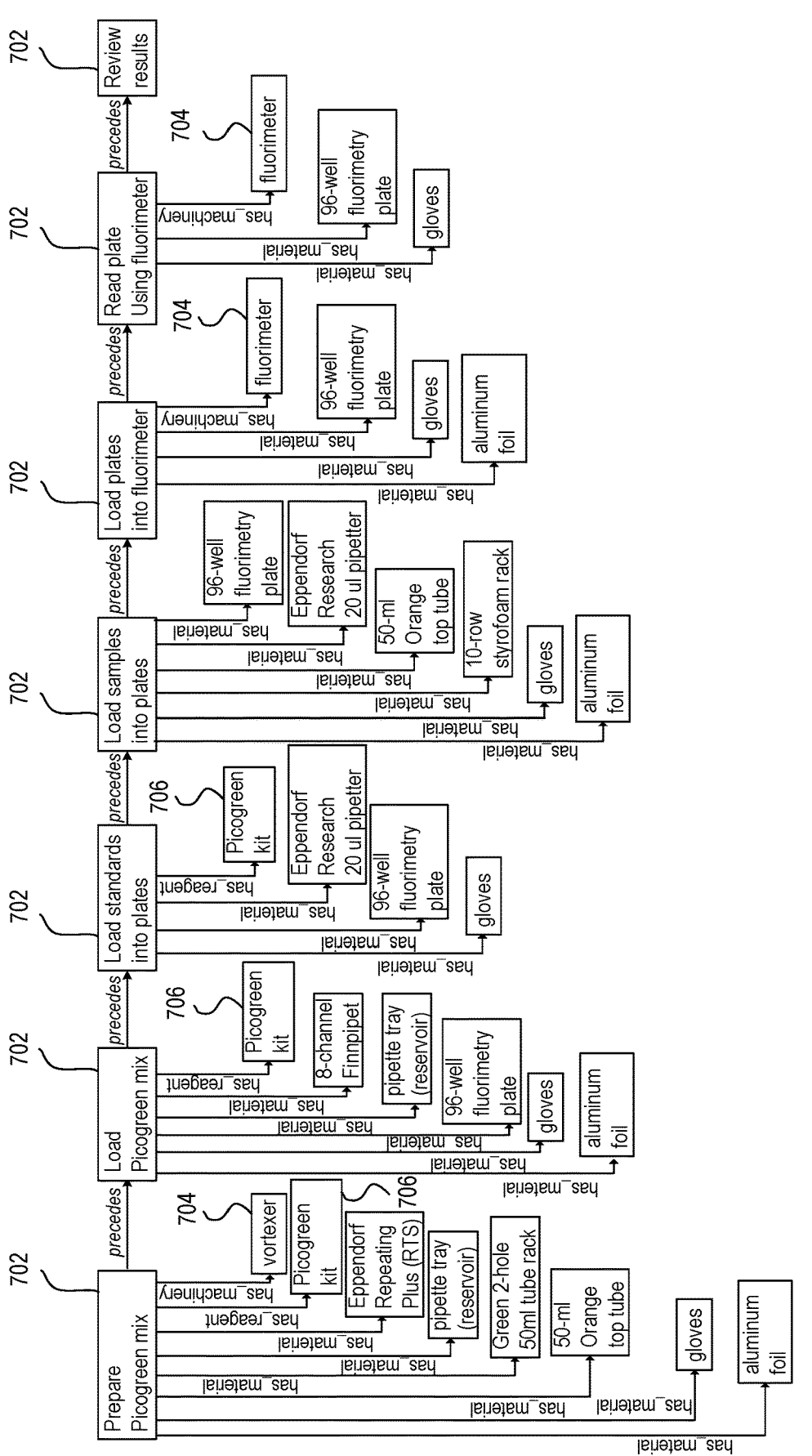
FIG. 7 depicts an example of a temporal encoding of a protocol in an ontology 304.

FIG. 7 depicts an example of a temporal encoding of a protocol in an ontology 304. The protocol is depicted as a structured model of steps, actions, materials, and timing. The protocol encoding comprises steps 702, equipment 704, reagents 706, and supplies (other boxes). The temporal relations represent the ordinality of the protocol steps. Each step temporally follows the preceding step, and progressions are "temporally dependent", meaning one step must precede a subsequent one and without the preceding step, the following one could not occur. For example, Load Picogreen is dependent upon Prepare Picogreen mix. The encoding facilitates, for example, queries to the knowledge base 302/ontology 304 duality to generate action cues for the next procedural step, to identify operator 310 interaction with out-of-sequence objects that might signal imminent operator error, and to suggest possible substitutes for items used in a protocol step.

Figure 8:
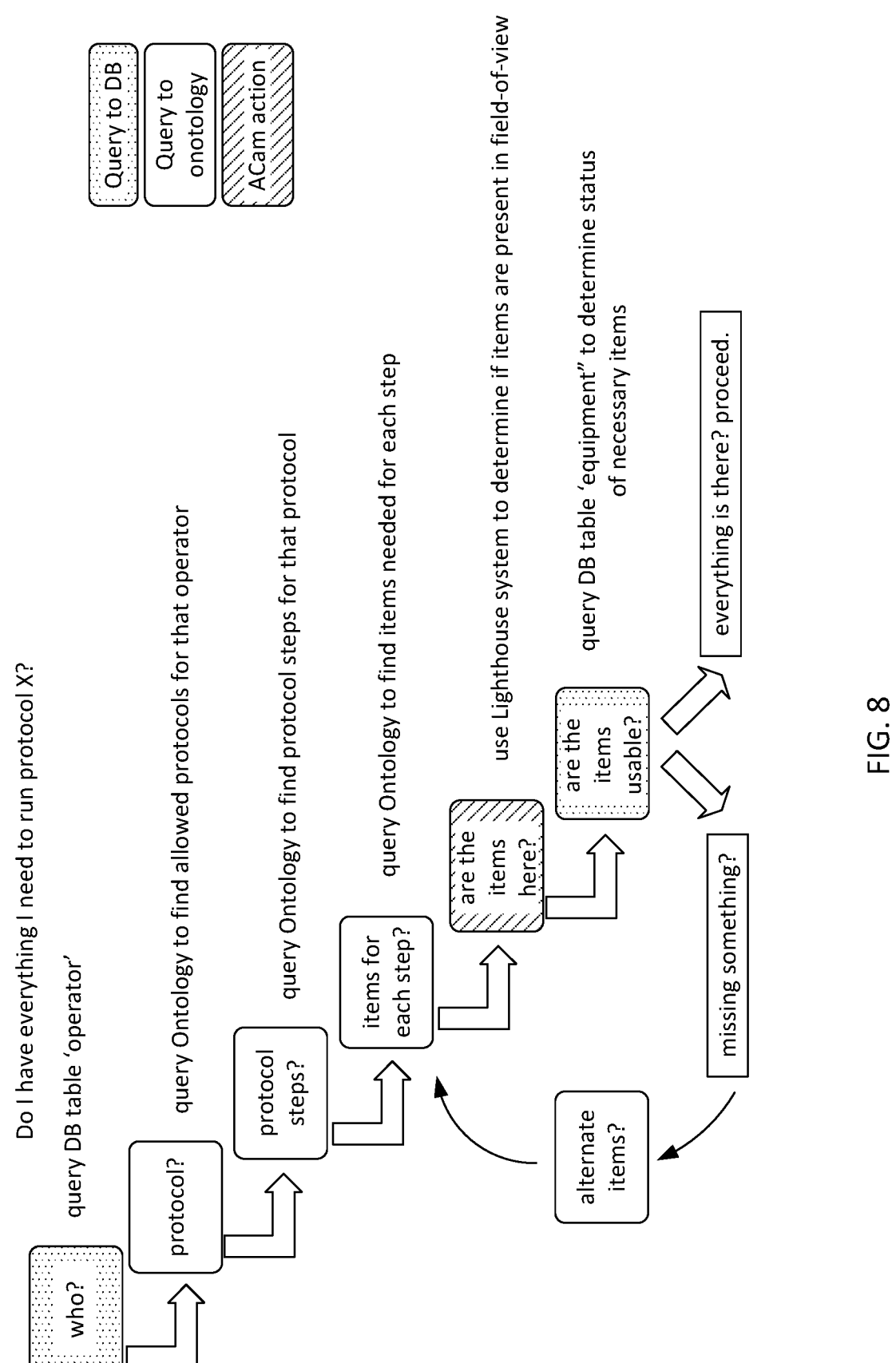
FIG. 8 depicts an example of applying the knowledge base 302/ontology 304 duality to aid completion of a process even subject to the absence or scarcity of key components.

FIG. 8 depicts an example of applying the knowledge base 302/ontology 304 duality to aid completion of a process even subject to the absence or scarcity of key components. In the depicted example, the protocol calls for a 15 mL_tube, which is not detected, but the augmented reality device 308 detects that a 50 mL_tube is present, and the procedural guidance logic 306 utilizes the ontology 304 to determine that the 50 mL_tube and the 15 mL_tube are (is_a) container in which liquids can be mixed. The results of such a workaround would be a procedure of equivalent quality. An organization could use it for internal QA/QC and it is likely that this substitution would pass muster even for an FDA-approved GMP procedure.

Figure 9:
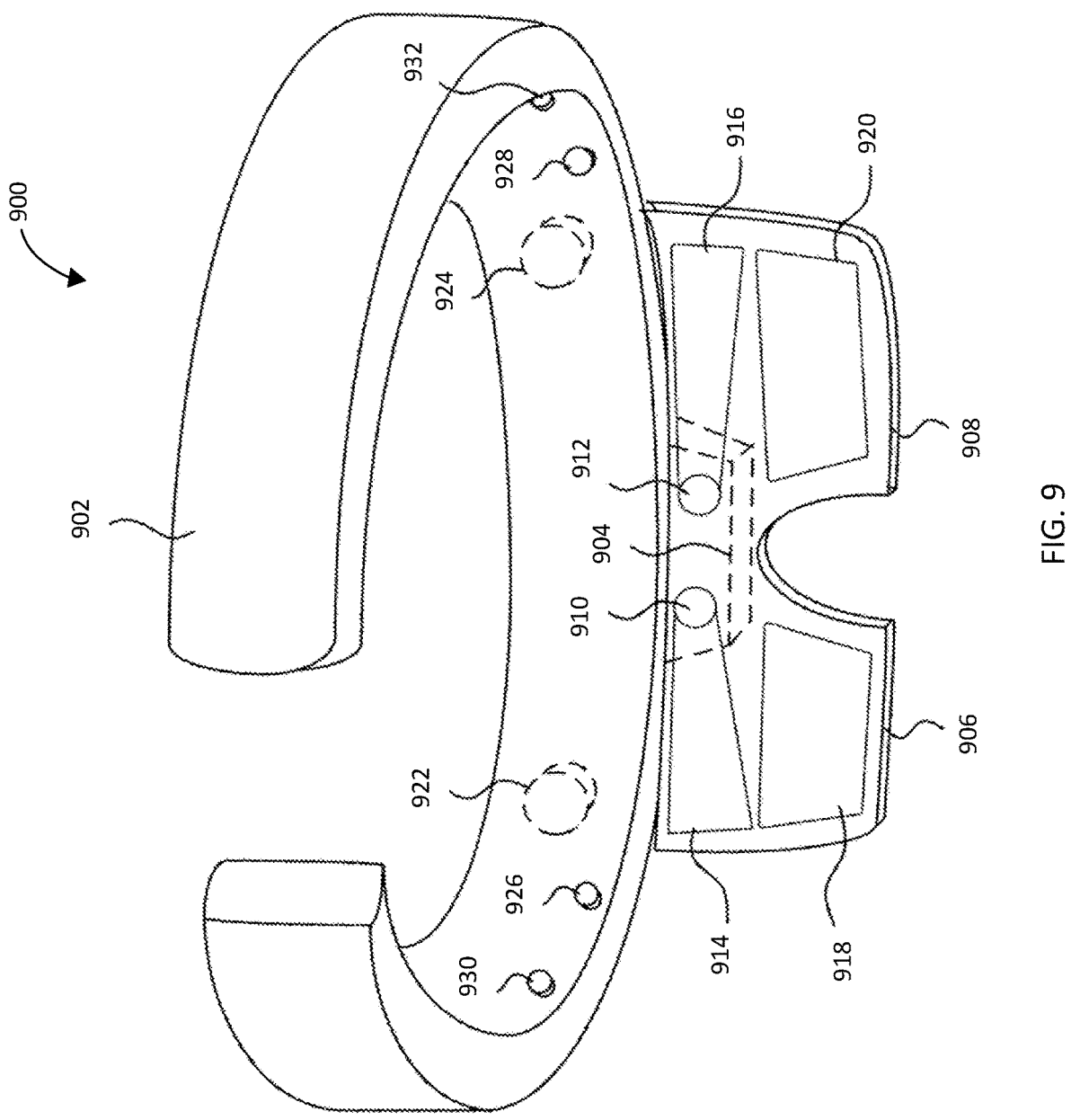
FIG. 9 depicts an augmented reality headset 900 in accordance with one embodiment.

FIG. 9 depicts a perspective view of a wearable augmented reality ("AR") augmented reality headset 900 in one embodiment. It may be appreciated that this is one example of the many extended reality headset platforms known in the art and that advances in headset technology are rapidly taking place resulting in many additional possible embodiments, including but not limited to eyeglass-like devices and contact lenses. The augmented reality headset 900 includes data processing and image display capabilities, as well as microphones enabling audio input, and speakers allowing the generation of spatially localized sounds in the user's FoH, in the form of a wearable headset. The augmented reality headset 900 comprises a headstrap 902 with a central portion 904 formed to fit over the nose bridge of a wearer and has an inner curvature intended to wrap around the wearer's head above their ears.

The headstrap 902 comprises a left optical component 906 and a right optical component 908, which are optical waveguides. For ease of reference herein, each optical component may be considered to be identical apart from being mirror images of each other. Therefore description pertaining to the left-hand component also pertains to the right-hand component.

Figure 10:
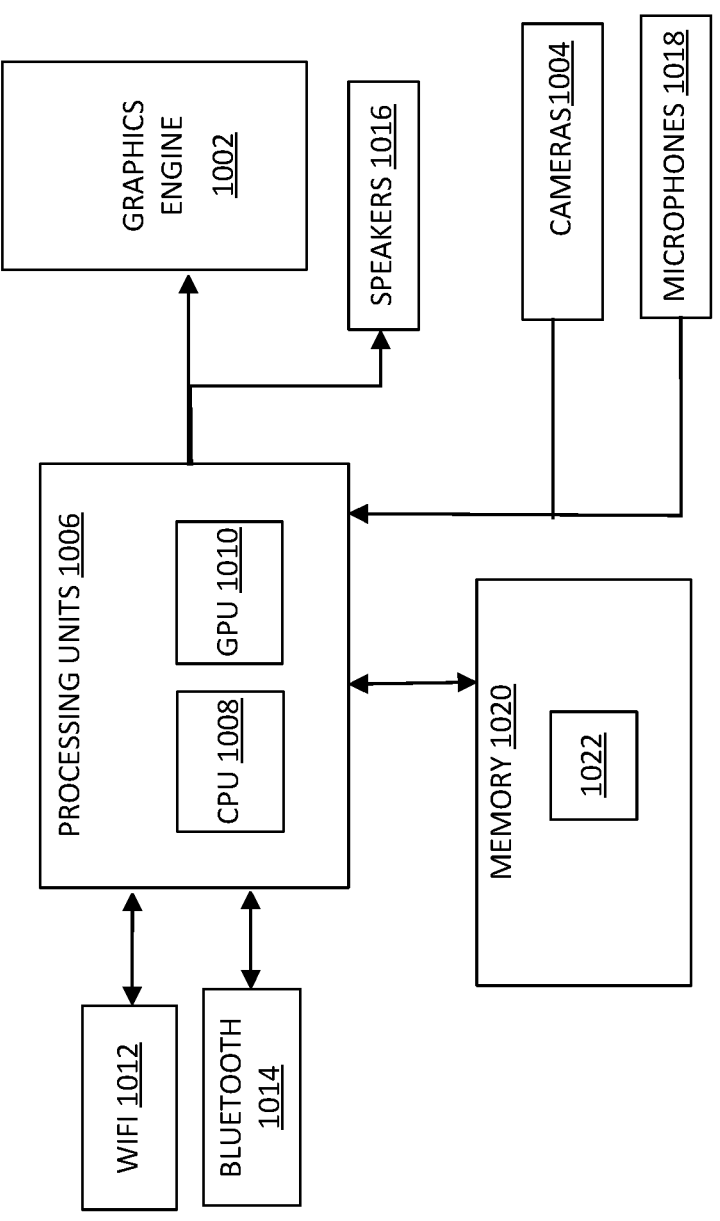
FIG. 10 depicts augmented reality headset logic 1000 in accordance with one aspect.

The augmented reality headset 900 comprises augmented reality headset logic 1000 an example of which is depicted in FIG. 10. The augmented reality headset 900 utilizes a graphics engine 1002 that may comprise a microdisplay and imaging optics in the form of a collimating lens (not shown). The microdisplay can be any type of image source, such as liquid crystal on silicon (LCOS) displays, transmissive liquid crystal displays (LCD), matrix arrays of LED's (whether organic or inorganic) and any other suitable display. The display is driven by circuitry known in the art to activate individual pixels of the display to generate an image. Substantially collimated light, from each pixel, falls on an exit pupil of the graphics engine 1002. At the exit pupil, the collimated light beams are coupled into each of the left optical component 906 and the right optical component 908 into a respective left in-coupling zone 910 and right in-coupling zone 912. In-coupled light is then guided, through a mechanism that may involve diffraction and total internal reflection (e.g., a refractive lens nestled inside a reflector) laterally of the optical component in a respective left intermediate zone 914 and right intermediate zone 916, and also downward into a respective left exit zone 918 and right exit zone 920 where it exits towards the users' eye.

The collimating lens collimates the image into a plurality of beams, which form a virtual version of the displayed image, the virtual version being a virtual image at infinity or other distance in the visual accommodation sense. The light exits as a plurality of beams, corresponding to the input beams and forming substantially the same virtual image, which the lens of the eye projects onto the retina to form a real image visible to the user. In this manner, the left optical component 906 and the right optical component 908 project the displayed image onto the wearer's eyes.

The various optical zones may, for example, be suitably arranged diffraction gratings or holograms. Each optical component has a refractive index n which is such that total internal reflection takes place to guide the beam from the light engine along the respective intermediate expansion zone, and down towards respective the exit zone.

Each optical component is substantially transparent, whereby the wearer can see through it to view a real-world environment in which they are located simultaneously with the projected image, thereby providing an augmented reality experience.

To provide a stereoscopic image, i.e. that is perceived as having 3D structure by the user, slightly different versions of a 2D image can be projected onto each eye for example from multiple graphics engine 1002 (i.e. two microdisplays), or from the same light engine (i.e. one microdisplay) using suitable optics to split the light output from the single display.

The augmented reality headset 900 is one exemplary configuration. For instance, where two light-engines are used, these may instead be at separate locations to the right and left of the device. Moreover, while in this example, the input beams that form the virtual image are generated by collimating light from the display, an alternative light engine based on so-called scanning can replicate this effect with a single beam, the orientation of which is fast modulated whilst simultaneously modulating its intensity and/or color. A virtual image can be simulated in this manner that is equivalent to a virtual image that would be created by collimating light of a (real) image on a display with collimating optics. Alternatively, a similar AR experience can be provided by embedding substantially transparent pixels in a glass or polymer plate in front of the wearer's eyes, having a similar configuration to the left optical component 906 and the right optical component 908 though without the need for the zone structures.

Other headstrap 902 embodiments are also within the scope of the subject matter. For instance, the display optics can equally be attached to the operator's head using a frame (in the manner of conventional spectacles), helmet or other fit system, and, in future, contact lenses or devices that project a direct beam onto the retina. The purpose of the fit system is to support the display and provide stability to the display and other head-borne systems such as tracking systems and cameras. The fit system can be designed to meet the user population in anthropometric range and head morphology and provide comfortable support for the display system.

The augmented reality headset 900 also comprises one or more cameras 1004—for example left stereo camera 922 and right stereo camera 924 mounted on the headstrap 902 and configured to capture an approximate view ("field of view") from the user's left and right eyes respectfully in this example. The cameras are located towards either side of the user's head on the headstrap 902, and thus capture images of the scene forward of the device from slightly different perspectives. In combination, the stereo cameras capture a stereoscopic moving image of the real-world environment as the device moves through it. A stereoscopic moving image comprises two moving images showing slightly different perspectives of the same scene, each formed of a temporal sequence of frames to be played out in quick succession to replicate movement. When combined, the two images give the impression of a moving 3D structure.

A left microphone 926 and a right microphone 928 are located at the front of the headpiece (from the perspective of the wearer). These and other possible additional microphones enable the localization of sounds from the operating environment. The headset also contains left and right channel speakers, earpieces, or other audio output transducers on the left and right of the headstrap 902. These are in the form of a pair of conventional speakers functioning as a left speaker 930 and a right speaker 932 audio channel output. The headset may comprise additional speakers to enable more precisely projected sounds into the operator's FoH.

FIG. 10 depicts exemplary augmented reality headset logic 1000. The augmented reality headset logic 1000 comprises a graphics engine 1002, a camera 1004, processing units 1006, including one or more CPU 1008 (central processing unit) and/or GPU 1010 (graphics processing unit), a WiFi 1012 wireless interface, a Bluetooth 1014 wireless interface, speakers 1016, microphones 1018, and one or more memory 1020.

The processing units 1006 may in some cases comprise programmable devices such as bespoke processing units (e.g., field-programmable gate arrays, application-specific integrated circuits) designed for a particular solution, such as augmented reality-related functions. The augmented reality headset logic 1000 may comprise other components that are not shown, such as dedicated depth sensors, additional interfaces, etc.

Some or all of the components in FIG. 10 may be housed in an augmented reality headset. In some embodiments, some of these components may be housed in a separate housing connected or in wireless communication with the components of the augmented reality headset. For example, a separate housing for some components may be designed to be worn or a belt or to fit in the wearer's pocket, or one or more of the components may be housed in a separate computer device (smartphone, tablet, laptop, desktop computer, etc.) which communicates wirelessly with the display and camera apparatus in the AR headset, whereby the headset and separate device constitute the full augmented reality headset logic 1000.

The memory 1020 comprises logic 1022 to be applied to the processing units 1006 to execute. In some cases, different parts of the logic 1022 may be executed by different components of the processing units 1006. The logic 1022 typically comprises code of an operating system, as well as code of one or more applications configured to run on the operating system to carry out aspects of the processes disclosed herein.

Figure 11:
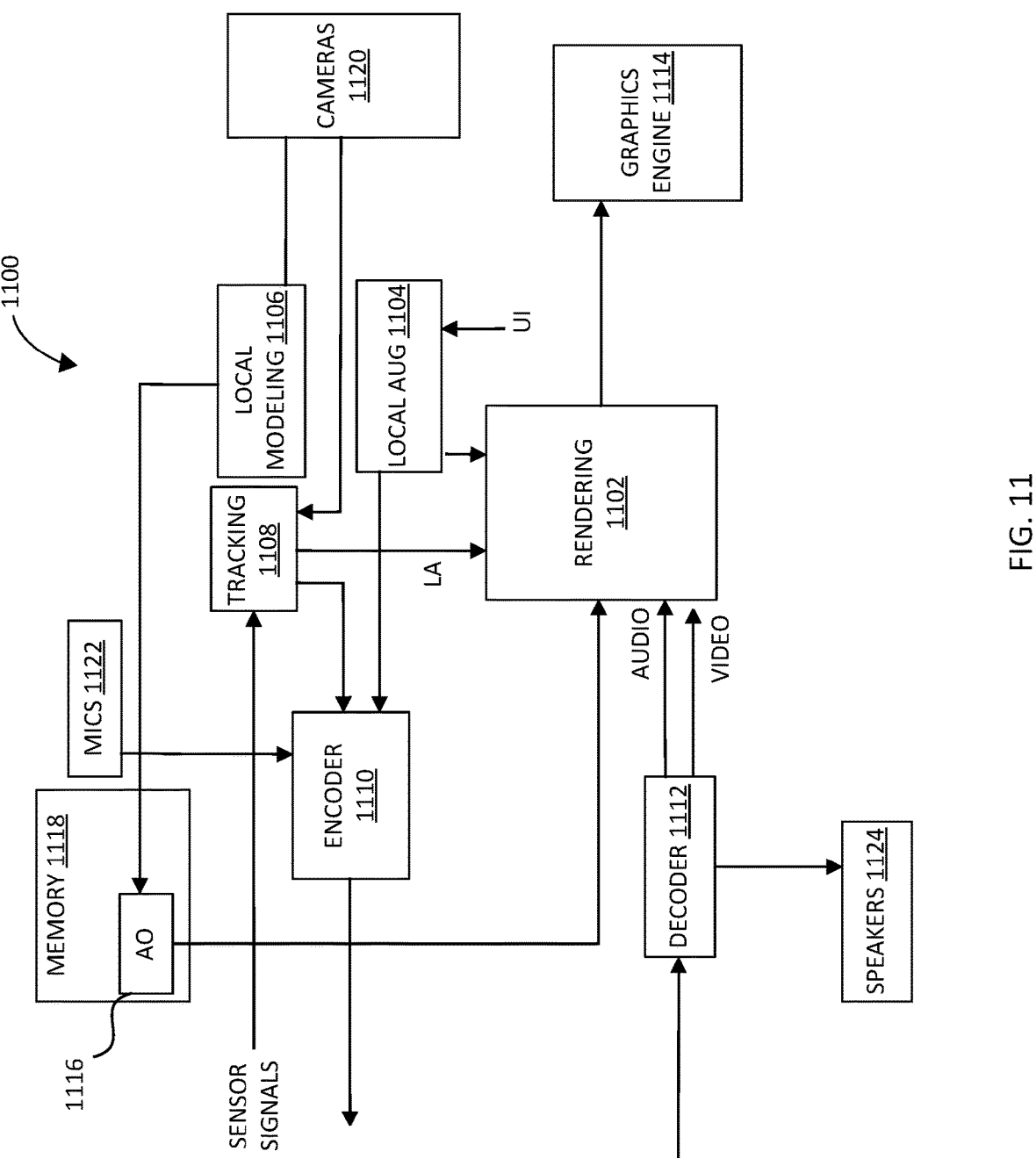
FIG. 11 depicts an augmented reality headset logic 1100 in one embodiment.

FIG. 11 depicts an embodiment of additional components of augmented reality headset logic 1100 including a rendering engine 1102, local augmentation logic 1104, local modeling logic 1106, a rendering engine 1102, device tracking logic 1108, an encoder 1110, and a decoder 1112. Each of these functional components may be implemented in software, dedicated hardware, firmware, or a combination of these logic types. These components may be distributed among one or more of an augmented camera, an augmented reality headset, and an auxiliary computing device such as a laptop, desktop, tablet, or cloud computer.

The rendering engine 1102 controls the graphics engine 1114 to generate a stereoscopic image visible to the wearer, i.e. to generate slightly different images that are projected onto different eyes by the optical components of a headset substantially simultaneously, so as to create the impression of 3D structure.

The stereoscopic image is formed by rendering engine 1102 rendering at least one virtual display element ("augmentation"), which is perceived as a 2D or 3D element at a real-world location in 3D space by the operator.

An augmentation is defined by an augmentation object 1116 stored in the memory 1118. The augmentation object 1116 comprises location data defining a desired spatial location and/or spatial orientation in 3D space for the virtual element (e.g. as (x,y,z) Cartesian coordinates). In some embodiments, the augmentation object 1116 may include additional settings such structural data defining the 3D surface structure of the virtual element, i.e. a 3D model of the virtual element, or color or texture or dynamic characteristics of the virtual element (for example, small changes in object outline, changes in brightness or color or other characteristics to direct the operator's attention); and/or operational aspects of the virtual elements such as controls or instructions, or unrelated virtual objects including text, graphics, user interfaces such as virtual keyboards, enabling open loop and closed loop operator guidance.

The perceived 3D effects are achieved through suitable rendering of the augmentation object 1116 in place of or superimposed with an image of the physical object it corresponds to. To give the impression of the augmentation having a 3D structure, a stereoscopic image may be generated based on the 2D surface and 3D augmentation model data in the data object, with the augmentation being rendered to appear at the desired location in the stereoscopic image.

A 3D model of a physical object is used to give the impression of the real-world having expected tangible effects on the augmentation, in the way that it would a real-world object. The 3D model represents a structure present in the real world, and the information it provides about this structure allows an augmentation to be displayed as though it were a real-world 3D object, thereby providing an immersive augmented reality experience. The 3D model may in some cases take the form of 3D mesh.

For example, based on the model of the real-world, an impression can be given of the augmentation being superimposed on a real-world object from the perspective of the operator, who may then (for example when the headset runs a procedure providing closed-loop guidance) dynamically interact with the real-world object, e.g. by manipulating the real-world object or operating it (in the case where the real-world object is a piece of equipment, for example). The operator can be directed to interact with a real-world object to learn more about it (U.S. Pat. No. 10,467,534). Augmentation and other virtual objects can change in response to operator actions (closed-loop procedural guidance)

Whether or not real-world structure should affect an augmentation can be determined based on suitable rendering criteria. In one example this could be done by creating a 3D model of the perceived real-world objects, which includes the real-world surface structure and any augmentations, and projecting it onto a plane along the operator's line of sight as determined using pose tracking (see below), or other suitable criteria for determining whether a real-world object should be perceived as being partially obscured by or obscuring an augmentation. One such criterion is whether the projection of the real-world object in the plane overlaps with the projection of the augmentation, which could be further refined to account for transparent or opaque real-world structures. Generally, the criteria can depend on the location and/or orientation of the augmented reality device and/or the real-world structure in question.

An augmentation can also be mapped to a mesh or bounding box for the real-world object, in the sense that its desired location and/or orientation is defined relative to the real-world object. Should that object move and/or rotate there will be a corresponding change in the location and/or orientation of the augmentation. For example, the desired location of an augmentation may be on, and defined relative to, a piece of equipment or material for a lab procedure. Should the object be moved, the augmentation moves with it. Object recognition can be used to this end, for example, to recognize a known shape of an object and thereby detect when the object has moved or changed orientation. Such object recognition techniques are known in the art. An augmentation that is mapped in this manner, or is otherwise associated with a particular real-world object, is referred to as an "annotation" to that object.

The local modeling logic 1106 generates the augmentation object 1116 in the memory 1118 using data received from sensor(s) e.g. cameras 1120 and/or any dedicated depth sensors etc. The local modeling logic 1106 and sensor(s) constitute sensing apparatus.

The device tracking logic 1108 tracks the location and orientation of the augmented reality headset using local sensor readings captured from sensors of the augmented reality headset (e.g., utilizing ChArUco markers). The sensor readings can be captured in a number of ways, for example using the cameras 1120 and/or other sensor(s) such as accelerometers. The device tracking logic 1108 determines the current location and orientation of the augmented reality headset relative to the spatial location and spatial orientation of the real-world object and provides this information to the rendering engine 1102, for example by outputting a current "pose vector". The pose vector is a six-dimensional vector, for example (x, y, z, P, R, Y) where (x,y,z) are the device's Cartesian coordinates with respect to a suitable origin, and (P, R, Y) are the device's pitch, roll and yaw with respect to suitable reference axes.

The rendering engine 1102 adapts the local model based on the tracking, to account for the movement of the device i.e. to maintain the perception of the as 3D elements occupying the real world, for example, to ensure that static augmentations appear to remain static (which may be achieved by scaling or rotating them as, from the operator's perspective, the environment is moving relative to them).

The encoder 1110 receives image data from the cameras 1120 and audio data from the microphones 1122 and possibly other types of data (e.g., annotation or text generated by the user of the AR device using the local augmentation logic 1104) and transmits that information to other devices, for example, the devices of collaborators in the augmented reality environment. The decoder 1112 receives an incoming data stream from other devices and extracts audio and video for the rendering engine 1102, audio for the speakers 1124, and possibly other types of data (e.g., annotations, text from a procedural work system) therefrom for including in the augmentation object 1116. The annotations, text, etc. need not be associated with a specific physical object in the workspace. Likewise, the augmentation object 1116 need not augment the depiction of an actual physical object (it could augment a virtual object, for example) or it may augment information about the depicted workspace or the process to be carried out therein.

There are two general ways of tracking an augmented reality headset (or virtual reality headset): outside-in tracking and inside-out tracking. Outside-in tracking uses fixed, wall-mounted trackers that observe active or passive fiducials on the headset to track its pose and orientation. Outside-in tracking is fast, accurate, and inexpensive, but involves the trackers and tracking volume to be set up before use and limits the user to that fixed tracking volume. Inside-out tracking does not involve fixed trackers or setup before use. In inside-out tracking, the headset simultaneously maps the environment and localizes itself in the environment. Inside-out tracking is known in the art as Simultaneous Localization and Mapping, or "SLAM."

In one implementation the headset comprises an on-board rendering engine and inside-out tracking (the HoloLens or HoloLens 2), however, resource-constrained headsets may also benefit from the disclosed mechanisms such as headsets with limited on-board processing power and/or headsets with outside-in tracking.

The systems disclosed herein, or particular components thereof, may in some embodiments be implemented as software comprising instructions executed on one or more programmable devices. By way of example, components of the disclosed systems may be implemented as an application, an app, drivers, or services. In one particular embodiment, the system is implemented as a service that executes as one or more processes, modules, subroutines, or tasks on a server device so as to provide the described capabilities to one or more client devices over a network (e.g., a cloud service platform). However, the system need not necessarily be accessed over a network and could, in some embodiments, be implemented by one or more applications on a single device or distributed between a mobile device and a computer, for example.

Figure 12:
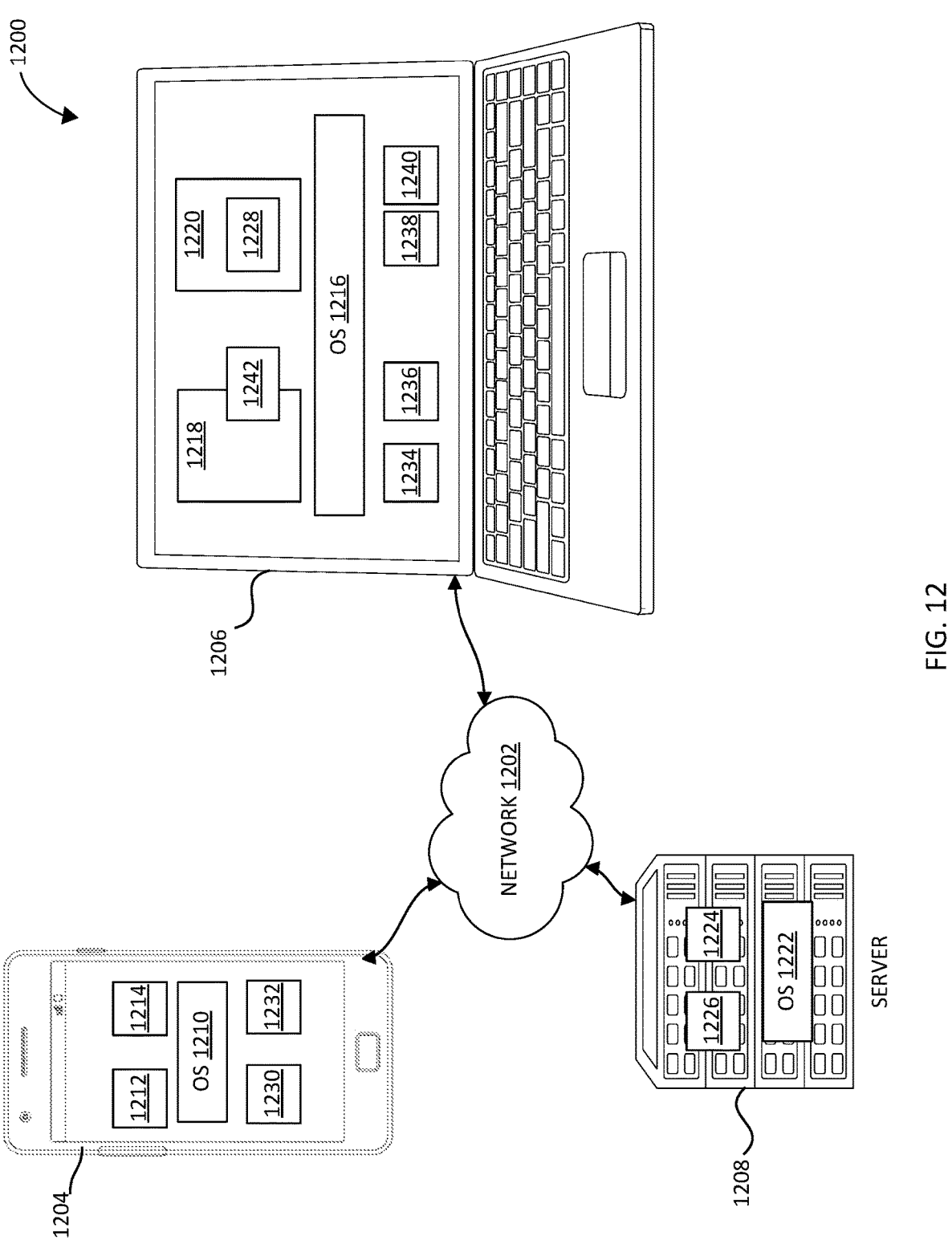
FIG. 12 illustrates a client-server network configuration 1200 in accordance with one embodiment.

Referring to FIG. 12, a client-server network configuration 1200 illustrates various computer hardware devices and software modules coupled by a network 1202 in one embodiment. Each device includes a native operating system, typically pre-installed on its non-volatile RAM, and a variety of software applications or apps for performing various functions. The headset devices are not depicted, however, it should be readily understood that they may interface either via a cable, network, or wirelessly to any one or more of the mobile programmable device 1204, computer 1206, and server 1208.

The mobile programmable device 1204 comprises a native operating system 1210 and various apps (e.g., app 1212 and app 1214). A computer 1206 also includes an operating system 1216 that may include one or more libraries of native routines to run executable software on that device. The computer 1206 also includes various executable applications (e.g., application 1218 and application 1220). The mobile programmable device 1204 and computer 1206 are configured as clients on the network 1202. A server 1208 is also provided and includes an operating system 1222 with native routines specific to providing a service (e.g., service 1224 and service 1226) available to the networked clients in this configuration.

As is well known in the art, an application, an app, or a service may be created by first writing computer code to form a computer program, which typically comprises one or more computer code sections or modules. Computer code may comprise instructions in many forms, including source code, assembly code, object code, executable code, and machine language. Computer programs often implement mathematical functions or algorithms and may implement or utilize one or more application program interfaces.

A compiler is typically used to transform source code into object code and thereafter a linker combines object code files into an executable application, recognized by those skilled in the art as an "executable". The distinct file comprising the executable would then be available for use by the computer 1206, mobile programmable device 1204, and/or server 1208. Any of these devices may employ a loader to place the executable and any associated library in memory for execution. The operating system executes the program by passing control to the loaded program code, creating a task or process. An alternate means of executing an application or app involves the use of an interpreter (e.g., interpreter 1228).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 1230 or driver 1232 on the mobile programmable device 1204 or computer 1206 (e.g., driver 1234 and driver 1236) might enable wireless headphones to be used for audio output(s) and a camera to be used for video inputs. Any of the devices may read and write data from and to files (e.g. file 1238 or file 1240) and applications or apps may utilize one or more plug-in (e.g., plug-in 1242) to extend their capabilities (e.g., to encode or decode video files).

The network 1202 in the client-server network configuration 1200 can be of a type understood by those skilled in the art, including a Local Area Network (LAN), Wide Area Network (WAN), Transmission Communication Protocol/Internet Protocol (TCP/IP) network, and so forth. These protocols used by the network 1202 dictate the mechanisms by which data is exchanged between devices.

LISTING OF DRAWING ELEMENTS

102 work environment
104 operator
106 augmented reality headset
108 augmented reality environment
110 physical object 112 physical object depiction
114 augmentation
116 augmented camera
118 physical workspace
120 superimposing logic
122 images or video
200 augmented reality system
202 augmented reality environment
204 operator
206 virtual object
208 physical workspace depiction
210 application
212 operating system
214 hardware
302 knowledge base
304 ontology
306 procedural guidance logic
308 augmented reality device
310 operator
312 machine learning logic
314 trainers
702 step
704 equipment
706 reagent
900 augmented reality headset
902 headstrap
904 central portion
906 left optical component
908 right optical component
910 left in-coupling zone
912 right in-coupling zone
914 left intermediate zone
916 right intermediate zone
918 left exit zone
920 right exit zone
922 left stereo camera
924 right stereo camera
926 left microphone
928 right microphone
930 left speaker
932 right speaker
1000 augmented reality headset logic
1002 graphics engine
1004 camera
1006 processing units
1008 CPU
1010 GPU
1012 WiFi
1014 Bluetooth
1016 speakers
1018 microphones
1020 memory
1022 logic
1100 augmented reality headset logic
1102 rendering engine
1104 local augmentation logic
1106 local modeling logic
1108 device tracking logic
1110 encoder
1112 decoder
1114 graphics engine
1116 augmentation object
1118 memory
1120 cameras
1122 microphones
1124 speakers
1200 client server network configuration 1202 network
1204 mobile programmable device
1206 computer
1208 server
1210 operating system
1212 app
1214 app
1216 operating system
1218 application
1220 application
1222 operating system
1224 service
1226 service
1228 interpreter
1230 driver
1232 driver
1234 driver
1236 driver
1238 file
1240 file
1242 plug-in Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, or memory storing program instructions that are executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 114(f) for that claim element. Accordingly, claims in this application that do not otherwise include the "means for" [performing a function] construct should not be interpreted under 35 U.S.C § 114(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. An augmented reality guidance system, comprising:
an augmented reality device;
one or more databases storing a knowledge base and an ontology;
one or more processors; and
memory including a plurality of computer-executable components that are executable by the one or more processors to perform a plurality of actions, the plurality of actions comprising:
receiving, from the augmented reality device, information related to an operator completing at least one protocol with respect to one or more objects in an augmented reality environment, each protocol in the at least one protocol including one or more steps;
determining based on the information and data in at least one of the ontology or the knowledge base, a next step in a protocol of the at least one protocol with respect to the one or more objects that is to be completed by the operator; and operator;
presenting, via an augmented reality headset of the augmented reality device, augmenting information for the one or more objects that guides the operator in completing the next step in the protocol for the one or more objects in the augmented reality environment;
based on a control structure of the one or more objects, determining whether the operator made an error in completing the next step in the protocol, wherein the control structure indicates permitted actions associated with the one or more objects and forbidden actions associated with the one or more objects; and in response to determining that the operator made the error in completing the next step in the protocol, updating the protocol using machine learning, data identifying the next step in the protocol, and data identifying the error.

2. The augmented reality guidance system of claim 1, wherein the one or more objects include a virtual object in the augmented reality environment or a physical object in a physical workspace that is represented in the augmented reality environment by a physical object depiction in a physical workspace depiction.

3. The augmented reality guidance system of claim 2, wherein the receiving includes receiving image detected by a camera of the augmented reality device related to the operator completing the at least one protocol with respect to the one or more physical objects in the physical workspace.

4. The augmented reality guidance system of claim 1, wherein the augmenting information that guides the operator includes one or more of controls, settings, instructions, cues, or warnings that are presented in the augmented reality environment via the augmented reality headset.

5. The augmented reality guidance system of claim 1, wherein the ontology includes a plurality of connected computable statements that encode at least one of permitted material entities and immaterial entities, properties and relationships for at least one of protocols, procedures, or processes.

6. The augmented reality guidance system of claim 5, wherein the ontology encodes one or more of:
whether conditions to carry out a particular procedure exist, the conditions including at least one of materials, objects, or relations;
recognition of correct operator completion of a step in the particular procedure; action cues for next actions in the particular procedure;
conditions that potentially correspond to safety hazards in the particular procedure; context-appropriate knowledge pertinent to objects in the particular procedure; or conditions indicative of imminent errors in the particular procedure.

7. The augmented reality guidance system of claim 6, wherein the ontology further encodes one or more of:
recovery steps for deviations to the particular procedure such as absences or shortages of materials and objects in the particular procedure while staying within quality and regulatory constraints; and
recovery steps from disruptions to the particular procedure, including time needed to complete a step, or to successfully execute a process or task while staying within the quality and regulatory constraints.

8. The augmented reality guidance system of claim 1, wherein the knowledge base comprises at least one of (1) properties of at least one of objects, materials, or operations that are organized according to the at least one protocol, (2) settings for the at least one protocol and the one or more steps in each protocol; and (3) entities that are members of multiple classes.

9. The augmented reality guidance system of claim 8, wherein memberships of the entities in the multiple classes are represented in the knowledge base by Directed Acyclic Graphs (DAGs).

10. The augmented reality guidance system of claim 1, wherein the data in the ontology partially or completely overlaps the data in the knowledge base.

11. The augmented reality guidance system of claim 1, wherein the data in the knowledge base is updated by a machine learning logic over a course of performing multiple protocols that include the at least one protocol to improve guidance provided by a guidance logic for performance of future protocols.

12. The augmented reality guidance system of claim 11, wherein updates to the knowledge base that are provided by the machine learning logic are at least one of vetted or curated by humans.

13. The augmented reality guidance system of claim 1, wherein the data in the ontology is augmented by updates from one or more human trainers.

14. The augmented reality guidance system of claim 1, wherein the actions further comprising:

receiving a query for guidance on one or more next steps in the at least one protocol; inputting the query to a query structure that includes at least one of the knowledge base or the ontology; and providing, via the query structure, information from the at least one of the knowledge base or the ontology in response to the query.

15. One or more non-transitory computer-readable media storing computer-executable instructions that upon execution cause one or more processors to perform acts comprising:

receiving, from an augmented reality device, images detected by a camera of the augmented reality device related to an operator completing at least one protocol with respect to one or more physical objects in a physical workspace, each protocol in the at least one protocol including one or more steps;

determining, based on the images and data in at least one of an ontology or a knowledge base, a next step in a protocol of the at least one protocol with respect to the one or more physical objects that is to be completed by the operator; and operator;

presenting, via an augmented reality headset of the augmented reality device, augmenting information for the one or more physical objects that guides the operator in completing the next step in the protocol for the one or more physical objects, the augmenting information being presented as augmentations to one or more corresponding physical object depictions of the one or more physical objects in an augmented reality environment that includes a physical workspace depiction of the physical workspace;

based on a control structure of the one or more objects, determining whether the operator made an error in completing the next step in the protocol, wherein the control structure indicates permitted actions associated with the one or more physical objects and forbidden actions associated with the one or more physical objects; and in response to determining that the operator made the error in completing the next step in the protocol, updating the protocol using machine learning, data identifying the next step in the protocol, and data identifying the error.

16. The one or more non-transitory computer-readable media of claim 15, wherein the augmenting information that guides the operator includes one or more of controls, settings, instructions, cues, or warnings that are presented in the augmented reality environment via the augmented reality headset.

17. The one or more non-transitory computer-readable media of claim 15, wherein the ontology includes a plurality of connected computable statements that encode at least one of permitted material entities and immaterial entities, properties and relationships for at least one of protocols, procedures, or processes.

18. The one or more non-transitory computer-readable media of claim 15, wherein the data in the ontology partially or completely overlaps the data in the knowledge base.

19. The one or more non-transitory computer-readable media of claim 15, wherein the acts further comprising:

receiving a query for guidance on one or more next steps in the at least one protocol; inputting the query to a query structure that includes at least one of the knowledge base or the ontology; and providing, via the query structure, information from the at least one of the knowledge base or the ontology in response to the query.

20. A computer-implemented method, comprising:

receiving, from an augmented reality device, information related to an operator completing at least one protocol with respect to one or more-virtual objects in an augmented reality environment, each protocol in the at least one protocol including one or more steps;

determining based on the information and data in at least one of an ontology or a knowledge base, a next step in a protocol of the at least one protocol with respect to the one or more objects that is to be completed by the operator, wherein the knowledge base comprises at least one of (1) properties of at least one of objects, materials, or operations that are organized according to a given protocol of the at least one protocol, (2) settings for the given protocol of the at least one protocol and one or more given steps in the given protocol of the at least one protocol, and (3) entities that are members of multiple classes; and presenting, via an augmented reality headset of the augmented reality device, augmenting information for the one or more-virtual objects that guides the operator in completing the next step in the protocol for the one or more-virtual objects in the augmented reality environment.

* * * * *